United States Patent
Tamaki et al.

(10) Patent No.: US 10,347,946 B2
(45) Date of Patent: Jul. 9, 2019

(54) NON-AQUEOUS ELECTROLYTE SECONDARY BATTERY, ELECTRODE BODY USED THEREFOR, AND METHOD OF MANUFACTURING THE ELECTRODE BODY

(71) Applicant: TOYOTA JIDOSHA KABUSHIKI KAISHA, Toyota-shi, Aichi-ken (JP)

(72) Inventors: Takuml Tamaki, Nisshin (JP); Satoru Takehara, Toyohashi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 240 days.

(21) Appl. No.: 15/522,497

(22) PCT Filed: Oct. 26, 2015

(86) PCT No.: PCT/IB2015/001983
§ 371 (c)(1),
(2) Date: Apr. 27, 2017

(87) PCT Pub. No.: WO2016/067084
PCT Pub. Date: May 6, 2016

(65) Prior Publication Data
US 2017/0317389 A1 Nov. 2, 2017

(30) Foreign Application Priority Data
Oct. 29, 2014 (JP) .................. 2014-220029

(51) Int. Cl.
*H01M 10/0587* (2010.01)
*H01M 4/525* (2010.01)
(Continued)

(52) U.S. Cl.
CPC ......... *H01M 10/0587* (2013.01); *H01M 2/16* (2013.01); *H01M 2/1673* (2013.01);
(Continued)

(58) Field of Classification Search
CPC .................................................. Y02T 10/7011
See application file for complete search history.

(56) References Cited

U.S. PATENT DOCUMENTS

| 2002/0014616 A1* | 2/2002 | Allcock | C08G 79/025 252/500 |
| 2005/0221182 A1* | 10/2005 | Fujiwara | H01M 4/13 429/231.1 |

(Continued)

FOREIGN PATENT DOCUMENTS

| JP | 2006-269321 A | 10/2006 | |
| JP | 2010-027551 | * 2/2010 | H01M 2/16 |

(Continued)

OTHER PUBLICATIONS

Wang et al., "New Additives to Improve the First-Cycle Charge-Discharge Performance of a Graphite Anode for Lithium-Ion Cells," J. Electrochem. Soc., 152 (10) A1996-A2001 (2005) (Year: 2005).*

*Primary Examiner* — Amanda J Barrow
(74) *Attorney, Agent, or Firm* — Sughrue Mion, PLLC

(57) ABSTRACT

An electrode body includes: a positive electrode that includes a positive electrode active material layer; a negative electrode that includes a negative electrode active material layer; and a separator that electrically separates the positive electrode and the negative electrode from each other, in which the positive electrode active material layer and the separator contain N-methylpyrrolidone (NMP). A N-methylpyrrolidone (NMP) content in the positive electrode active material layer is 54 ppm to 602 ppm with respect to a total solid content of the positive electrode active material layer, and a N-methylpyrrolidone content (NMP) in the separator is 10 ppm to 26 ppm with respect to the total solid content of the positive electrode active material layer.

10 Claims, 7 Drawing Sheets

| Example | Positive Electrode | Standing Time (hr) | NMP Content (ppm) Positive Electrode Active Material Layer | Separator | Initial Output Value (W) | Output Value (W) after Durability Test | Output Retention Ratio(%) |
|---|---|---|---|---|---|---|---|
| 1 | A | 0 | 34 | 2 | 127 | 120 | 94.5 |
| 2 |  | 1 | 32 | 10 | 127 | 122 | 96.1 |
| 3 |  | 2 | 35 | 22 | 126 | 122 | 96.8 |
| 4 |  | 4 | 34 | 29 | 127 | 122 | 96.1 |
| 5 | B | 0 | 53 | 3 | 128 | 121 | 94.5 |
| 6 |  | 1 | 55 | 11 | 128 | 126 | 98.4 |
| 7 |  | 2 | 54 | 24 | 127 | 126 | 99.2 |
| 8 |  | 4 | 53 | 31 | 128 | 121 | 94.5 |
| 9 | C | 0 | 106 | 1 | 126 | 120 | 95.2 |
| 10 |  | 1 | 99 | 11 | 126 | 127 | 100.8 |
| 11 |  | 2 | 101 | 25 | 126 | 127 | 100.8 |
| 12 |  | 4 | 99 | 31 | 126 | 122 | 96.8 |
| 13 | D | 0 | 299 | 2 | 127 | 121 | 95.3 |
| 14 |  | 1 | 298 | 10 | 127 | 126 | 99.2 |
| 15 |  | 2 | 300 | 25 | 126 | 126 | 100.0 |
| 16 |  | 4 | 297 | 31 | 127 | 120 | 94.5 |
| 17 | E | 0 | 497 | 1 | 126 | 120 | 95.2 |
| 18 |  | 1 | 499 | 11 | 126 | 125 | 99.2 |
| 19 |  | 2 | 493 | 25 | 125 | 125 | 100.0 |
| 20 |  | 4 | 498 | 31 | 126 | 121 | 96.0 |
| 21 | F | 0 | 599 | 3 | 126 | 119 | 94.4 |
| 22 |  | 1 | 601 | 10 | 125 | 124 | 99.2 |
| 23 |  | 2 | 602 | 26 | 126 | 124 | 98.4 |
| 24 |  | 4 | 600 | 33 | 125 | 118 | 94.4 |
| 25 | G | 0 | 700 | 3 | 119 | 110 | 92.4 |
| 26 |  | 1 | 703 | 11 | 118 | 109 | 92.4 |
| 27 |  | 2 | 706 | 26 | 118 | 109 | 92.4 |
| 28 |  | 4 | 698 | 34 | 119 | 110 | 92.4 |

(51) Int. Cl.
- *H01M 4/505* (2010.01)
- *H01M 4/587* (2010.01)
- *H01M 10/0525* (2010.01)
- *H01M 2/16* (2006.01)
- *H01M 4/131* (2010.01)
- *H01M 4/1391* (2010.01)
- *H01M 4/62* (2006.01)
- *H01M 10/052* (2010.01)

(52) U.S. Cl.
CPC ......... *H01M 4/131* (2013.01); *H01M 4/1391* (2013.01); *H01M 4/505* (2013.01); *H01M 4/525* (2013.01); *H01M 4/587* (2013.01); *H01M 4/62* (2013.01); *H01M 10/052* (2013.01); *H01M 10/0525* (2013.01); *H01M 2/1653* (2013.01); *H01M 2220/20* (2013.01); *Y02T 10/7011* (2013.01)

(56) References Cited

U.S. PATENT DOCUMENTS

| | | | |
|---|---|---|---|
| 2007/0048435 A1* | 3/2007 | Suzuki | H01G 11/86 427/58 |
| 2010/0136412 A1* | 6/2010 | Watanabe | H01M 4/505 429/144 |
| 2011/0236758 A1* | 9/2011 | Takahashi | H01M 4/364 429/222 |
| 2012/0007560 A1* | 1/2012 | Smart | H01M 6/164 320/127 |

FOREIGN PATENT DOCUMENTS

| | | | | |
|---|---|---|---|---|
| JP | 2010027551 A | | 2/2010 | |
| JP | 2010-067358 | * | 3/2010 | ............. H01M 2/16 |
| JP | 2010-067358 A | | 3/2010 | |
| JP | 2013-065409 | * | 4/2013 | ............ H01M 4/485 |
| JP | 2013-065409 A | | 4/2013 | |
| JP | 2013254698 A | | 12/2013 | |

* cited by examiner

F I G . 1
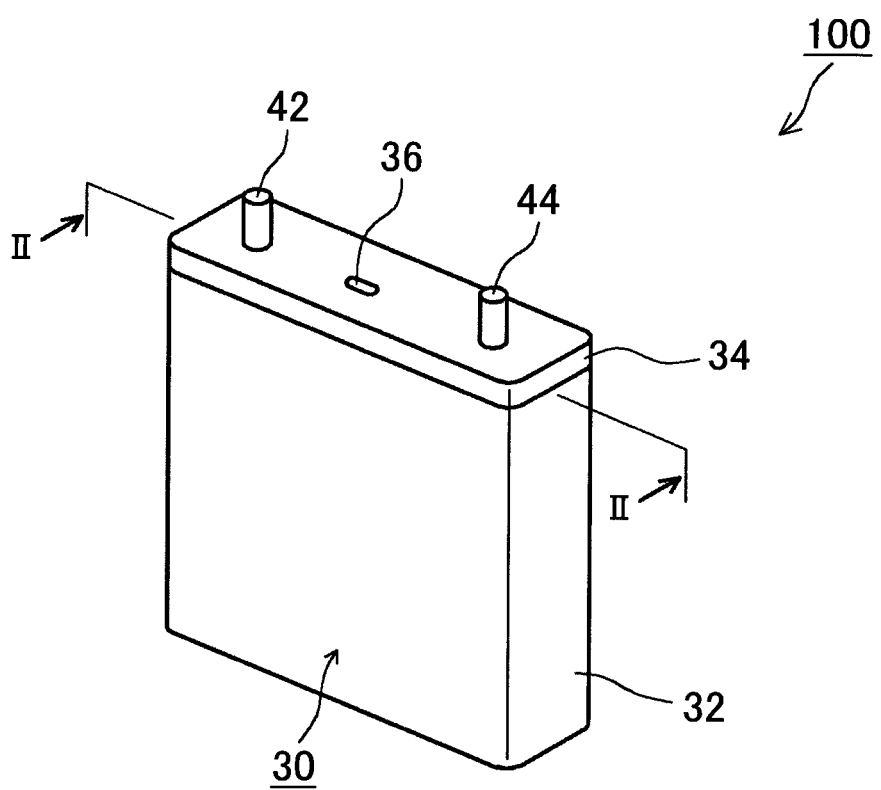

FIG.6

| Positive Electrode | Drying Conditions of Positive Electrode | | NMP Content (ppm) in Positive Electrode Material Layer |
|---|---|---|---|
| | Temperature (°C) | Time (sec) | |
| A | 160 | 72 | 57 |
| B | 160 | 36 | 89 |
| C | 145 | 36 | 168 |
| D | 135 | 36 | 501 |
| E | 130 | 36 | 833 |
| F | 125 | 36 | 1004 |
| G | 120 | 36 | 1173 |

FIG. 7

| Example | Positive Electrode | Standing Time (hr) | NMP Content (ppm) Positive Electrode Active Material Layer | Separator | Initial Output Value (W) | Output Value (W) after Durability Test | Output Retention Ratio(%) |
|---|---|---|---|---|---|---|---|
| 1 | A | 0 | 34 | 2 | 127 | 120 | 94.5 |
| 2 | A | 1 | 32 | 10 | 127 | 122 | 96.1 |
| 3 | A | 2 | 35 | 22 | 126 | 122 | 96.8 |
| 4 | A | 4 | 34 | 29 | 127 | 122 | 96.1 |
| 5 | B | 0 | 53 | 3 | 128 | 121 | 94.5 |
| 6 | B | 1 | 55 | 11 | 128 | 126 | 98.4 |
| 7 | B | 2 | 54 | 24 | 127 | 126 | 99.2 |
| 8 | B | 4 | 53 | 31 | 128 | 121 | 94.5 |
| 9 | C | 0 | 100 | 1 | 126 | 120 | 95.2 |
| 10 | C | 1 | 99 | 11 | 126 | 127 | 100.8 |
| 11 | C | 2 | 101 | 25 | 126 | 127 | 100.8 |
| 12 | C | 4 | 99 | 31 | 126 | 122 | 96.8 |
| 13 | D | 0 | 299 | 2 | 127 | 121 | 95.3 |
| 14 | D | 1 | 298 | 10 | 127 | 126 | 99.2 |
| 15 | D | 2 | 300 | 25 | 126 | 126 | 100.0 |
| 16 | D | 4 | 297 | 31 | 127 | 120 | 94.5 |
| 17 | E | 0 | 497 | 1 | 126 | 120 | 95.2 |
| 18 | E | 1 | 499 | 11 | 126 | 125 | 99.2 |
| 19 | E | 2 | 493 | 25 | 125 | 125 | 100.0 |
| 20 | E | 4 | 498 | 31 | 126 | 121 | 96.0 |
| 21 | F | 0 | 599 | 3 | 126 | 119 | 94.4 |
| 22 | F | 1 | 601 | 10 | 125 | 124 | 99.2 |
| 23 | F | 2 | 602 | 26 | 126 | 124 | 98.4 |
| 24 | F | 4 | 600 | 33 | 125 | 118 | 94.4 |
| 25 | G | 0 | 700 | 3 | 119 | 110 | 92.4 |
| 26 | G | 1 | 703 | 11 | 118 | 109 | 92.4 |
| 27 | G | 2 | 706 | 26 | 118 | 109 | 92.4 |
| 28 | G | 4 | 698 | 34 | 119 | 110 | 92.4 |

NON-AQUEOUS ELECTROLYTE SECONDARY BATTERY, ELECTRODE BODY USED THEREFOR, AND METHOD OF MANUFACTURING THE ELECTRODE BODY

CROSS REFERENCE TO RELATED APPLICATIONS

This application is a National Stage of International Application No. PCT/IB2015/001983 filed Oct. 26, 2015, claiming priority based on Japanese Patent Application No. 2014-220029 filed Oct. 29, 2014, the contents of all of which are incorporated herein by reference in their entirety.

BACKGROUND OF THE INVENTION

1. Field of the Invention

The present invention relates to a nonaqueous electrolyte secondary battery and an electrode body used for the nonaqueous electrolyte secondary battery.

2. Description of Related Art

A nonaqueous electrolyte secondary battery such as a lithium ion secondary battery (lithium secondary battery) has a lighter weight and higher energy density than those of existing batteries. Therefore, recently, a nonaqueous electrolyte secondary battery has been preferably used as a so-called portable power supply for a PC, a portable device, or the like or as a drive power supply for a vehicle. In particular, a light-weight lithium ion secondary battery capable of obtaining high energy density is preferably used as a high-output power supply for driving a vehicle such as an electric vehicle (EV), a hybrid vehicle (HV), or a plug-in hybrid vehicle (PHV).

In a typical configuration of the nonaqueous electrolyte secondary battery, a positive electrode and a negative electrode respectively include: current collectors that are formed of highly conductive metal such as aluminum (positive electrode) and copper (negative electrode); and a positive electrode active material layer and a negative electrode active material layer that are formed on the current collectors and contain compounds (called a positive electrode active material and a negative electrode active material) capable of reversibly storing and releasing charge carriers. These positive and negative electrode active material layers contain various additives in addition to the active materials which are major components. For example, a binder is added to the positive electrode active material layer and the negative electrode active material layer to improve adhesion and realize structural stability. A conductive material (typically, a carbon material such as carbon black) is added to the positive electrode active material layer to improve conductivity. In addition, techniques of adding various additives to the positive electrode active material layer and the negative electrode active material layer for various purposes have been proposed.

As an example of the additives, Japanese Patent Application Publication No. 2013-065409 (JP 2013-065409 A) describes a nonaqueous electrolyte secondary battery in which N-methylpyrrolidone (hereinafter, referred to as "NMP") as an additive is added to a positive electrode active material layer. JP 2013-065409 A describes that the flexibility of the positive electrode active material layer and the adhesion between the positive electrode active material layer and a current collector can be improved by adding NMP to the positive electrode active material layer; as a result, the cracking of the positive electrode active material layer and the peeling of the positive electrode active material layer from the positive electrode current collector can be prevented.

However, when the nonaqueous electrolyte secondary battery described in JP 2013-065409 A in which NMP is added to the positive electrode active material layer is used as a drive power supply for an electric vehicle (EV), a hybrid vehicle (HEV), or a plug-in hybrid vehicle (PHV), it is required that high battery performance can be exhibited over a long period of time, for example, 10 years or longer (a long service life is required). A simple increase in the amount of NMP in the positive electrode active material layer cannot maintain advantageous effects, which are obtained by adding NMP to the positive electrode active material layer, over a long period of time. That is, this is because NMP added to the positive electrode active material layer during battery construction is lost from the positive electrode active material layer as time elapses from the start of use of the battery. However, when an excess amount of NMP is added to a positive electrode active material layer in advance during battery construction in consideration of the loss, the excess amount of NMP causes an increase in the internal resistance (reaction resistance) of the battery, which is not preferable.

SUMMARY OF THE INVENTION

The invention has been made in order to solve the above-described problems of the related art, and an object thereof is to provide a nonaqueous electrolyte secondary battery capable of: allowing an appropriate amount of NMP to be present in a positive electrode active material layer over a long period of time of use after battery construction; and maintaining advantageous effects in terms of battery performance (for example, high output characteristics), which are obtained by the presence of NMP, over a long period of time. Another object of the invention is to provide an electrode body which is used for the nonaqueous electrolyte secondary battery to realize the above-described object.

The present inventors performed a thorough research regarding the reason why the NMP content in a positive electrode active material layer decreases over time. In the related art, it is considered that the NMP content in a positive electrode active material layer decreases because NMP in the positive electrode active material layer is gradually dissolved in a nonaqueous electrolytic solution. On the other hand, the present inventors found that the NMP content in a positive electrode active material layer decreases because NMP is oxidized and decomposed on a surface of a positive electrode active material. The present inventors found a configuration capable of adding a predetermined amount of NMP to a separator such that NMP in the separator can be supplied to a positive electrode active material layer, thereby completing the invention.

In order to realize the above described object, according to an aspect of the invention, there is provided an electrode body used for a nonaqueous electrolyte secondary battery, the electrode body including: a positive electrode including a positive electrode active material layer that contains a positive electrode active material; a negative electrode including a negative electrode active material layer that contains a negative electrode active material; and a separator that electrically separates the positive electrode and the negative electrode from each other. The positive electrode active material layer and the separator contain N-methylpyrrolidone. Here, a N-methylpyrrolidone content in the positive electrode active material layer is 54 ppm to 602 ppm with respect to a total solid content of the positive electrode active material layer, and a N-methylpyrrolidone content in the separator is 10 ppm to 26 ppm with respect to the total solid content of the positive electrode active material layer.

By constructing a nonaqueous electrolyte secondary battery using the electrode body having the above-described configuration, an effect of improving battery performance, which is obtained by adding N-methylpyrrolidone to the positive electrode active material layer, can be maintained over a long period of time. That is, high battery performance (for example, high output characteristics) can be exhibited over a long period of time. It is presumed that the effect is exhibited because N-methylpyrrolidone contained in the separator compensates for the loss of N-methylpyrrolidone in the positive electrode active material layer which is caused when used over a long period of time. That is, in the electrode body having the above-described configuration, an appropriate amount of N-methylpyrrolidone is maintained in the positive electrode active material layer over a long period of time. Therefore, during the construction of a nonaqueous electrolyte secondary battery, the electrode body can be used as an electrode body capable of maintaining an effect of improving battery performance, which is obtained by adding N-methylpyrrolidone to the positive electrode active material layer, over a long period of time. Therefore, according to the invention, there can be provided a nonaqueous electrolyte secondary battery including: the electrode body disclosed herein; and a nonaqueous electrolytic solution.

Each of "N-methylpyrrolidone content in the positive electrode active material layer" and "N-methylpyrrolidone content in the separator" can be obtained as the content (ppm) of N-methylpyrrolidone with respect to the total solid content of the positive electrode active material layer, for example, by dividing the amount ($g/m^2$) of N-methylpyrrolidone contained per unit area of the positive electrode active material layer or the separator by the mass ($g/m^2$) of the positive electrode active material layer provided per unit area of the positive electrode current collector, that is, the mass per unit area ($g/m^2$) of the positive electrode active material layer. When the positive electrode active material layer is provided on both surfaces of the positive electrode current collector, "mass per unit area of the positive electrode active material layer" refers to the total mass per unit area of the positive electrode active material layers provided on the surfaces of the positive electrode current collector. Here, the amount ($g/m^2$) of N-methylpyrrolidone contained per unit area of the positive electrode active material layer or the separator can be measured, for example, using gas chromatography-mass spectrometry (GC-MS).

In this specification, "nonaqueous electrolyte secondary battery" refers to batteries including a nonaqueous electrolytic solution (typically, an electrolytic solution containing a supporting electrolyte in a nonaqueous solvent (organic solvent)). In this specification, "secondary battery" refers to general batteries which can be repeatedly charged and discharged and is a collective term for chemical batteries such as a lithium ion secondary battery and physical batteries such as an electric double layer capacitor.

Japanese Patent Application Publication No. 2010-067358 (JP 2010-067358 A) describes a separator containing N-methylpyrrolidone. However, JP 2010-067358 A neither discloses nor implies the effect of improving battery performance which is obtained by adding N-methylpyrrolidone to the positive electrode active material layer. That is, the technique described in JP 2010-067358 A is based on a technical idea which is completely different from that described in the invention. In addition, JP 2010-067358 A neither discloses nor implies the configuration in which the gradual loss of N-methylpyrrolidone in the positive electrode active material layer is compensated by adding N-methylpyrrolidone to the separator. Therefore, the above-described effect was initially discovered by the present inventors.

In the aspect of the electrode body described here, the positive electrode active material is a lithium composite oxide. In general, a nonaqueous electrolyte secondary battery in which a lithium composite oxide is used as a positive electrode active material, that is, a lithium ion secondary battery exhibits high energy density and high battery capacity and thus can be used at a high operation voltage. Therefore, the lithium ion secondary battery can be used as a high-output power supply. In addition, the lithium ion secondary battery has superior cycle characteristics and can be charged and discharged at high input and output densities; therefore, can be used for an application in which high-rate charging and discharging is repeated. Due to these characteristics, the electrode body having the above-described configuration can be used as an electrode body which is used in a battery for a vehicle such as a drive power supply for a vehicle. When a nonaqueous electrolyte secondary battery is used as a battery for a vehicle (typically, a drive power supply for a vehicle), it is required that high battery performance can be exhibited over a long period of time, for example, 10 years or longer (a long service life is required). Therefore, the effects obtained by adopting the invention can be particularly exhibited.

In the aspect of the electrode body described here, the electrode body is a wound electrode body in which the elongated positive electrode, the elongated negative electrode, and the elongated separator are laminated and wound in a longitudinal direction. When an electrode body is configured as the above-described wound electrode body, the capacity of the electrode body can increase. The wound electrode body is suitable for mass-production. The present invention is applicable to the wound electrode body.

In addition, according to another aspect of the invention, there is provided a method of manufacturing an electrode body, the electrode body including a positive electrode, a negative electrode, and a separator, the positive electrode including a positive electrode active material layer containing a positive electrode active material, the negative electrode including a negative electrode active material layer containing a negative electrode active material, the separator electrically separating the positive electrode and the negative electrode from each other. That is, the method described here includes: (i) a step for preparing a positive electrode in which a positive electrode active material layer is formed on a positive electrode current collector by applying a positive electrode active material layer-forming composition, which contains a positive electrode active material and N-methylpyrrolidone, to the positive electrode current collector, the positive electrode active material layer containing N-methylpyrrolidone; (ii) a step for laminating the positive electrode, and the negative electrode with the separator interposed therebetween to obtain a laminate; and (iii) a step for standing of the laminate to stand for a predetermined amount of time such that a part of N-methylpyrrolidone in the positive electrode active material layer is moved into the separator; and (iv) a step for drying the laminate after the standing, here, the step for standing and the step for drying are performed such that a N-methylpyrrolidone content in the positive electrode active material layer of the laminate after the step of drying, is 54 ppm to 602 ppm with respect to a total solid content of the positive electrode active material layer, and a N-methylpyrrolidone content in the separator of the dry laminate is 10 ppm to 26 ppm with respect to the total solid content of the positive electrode active material layer.

According to the above-described method of manufacturing an electrode body, a part of N-methylpyrrolidone contained (remaining) in the positive electrode active material layer during the positive electrode preparation step can be moved into the separator during the standing step. As a result, an electrode body in which the positive electrode active material layer and the separator contain an appropriate amount of N-methylpyrrolidone can be manufactured. By adjusting the amount of N-methylpyrrolidone contained (remaining) in the positive electrode active material layer in the positive electrode preparation step and by appropriately setting drying conditions in the drying step, the amount of N-methylpyrrolidone contained in the positive electrode active material layer after the drying step can be adjusted to be within a preferable range. In addition, by adjusting standing conditions in the standing step and by adjusting drying conditions in the drying step, the amount of N-methylpyrrolidone contained in the separator after the drying step can be adjusted to be within a preferable range.

In the aspect of the method for manufacturing an electrode body described here, during the standing of the laminate, the laminate is left to stand in a normal-temperature and normal-humidity environment for 1 hour to 2 hours. According to the manufacturing method, a part of N-methylpyrrolidone contained in the positive electrode active material can be moved to the separator. As a result, an appropriate amount of N-methylpyrrolidone can be added to the positive electrode active material layer and the separator.

In this specification, "normal temperature" refers to a temperature (room temperature, ambient temperature) defined according to JIS Z 8703 (1983). Specifically, "normal temperature" refers to a temperature in a range of 20° C.±15° C. (5° C. to 35° C.). In this specification, "normal humidity" refers to a humidity (relative humidity) defined according to JIS Z 8703 (1983). Specifically, "normal humidity" refers to a humidity (relative humidity) in a range of 65% rh±20% rh (45% rh to 85% rh).

In the aspect of the method for manufacturing an electrode body described here, a N-methylpyrrolidone content in a positive electrode active material layer of a positive electrode before an electrode body may be configured is 89 ppm to 1004 ppm with respect to a total solid content of the positive electrode active material layer.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a perspective view schematically showing the external appearance of a nonaqueous electrolyte secondary battery according to an embodiment of the invention;

FIG. 6 is a table showing the results of measuring the NMP content in a positive electrode active material layer of each of positive electrodes (positive electrodes A to G); and FIG. 7 is a table showing the results of evaluating the durability of each of batteries according to Examples 1 to 28.

DETAILED DESCRIPTION OF EMBODIMENTS

Figure 2:
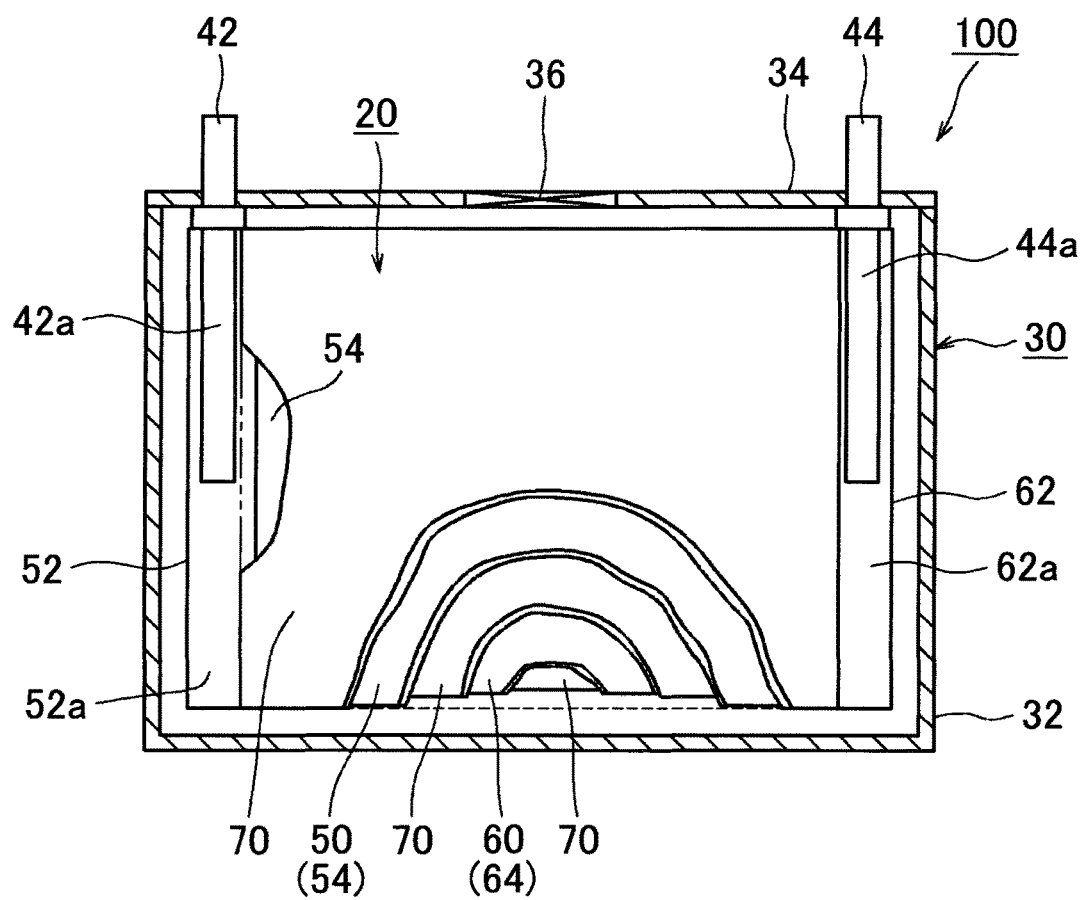
FIG. 2 is a longitudinal sectional view schematically showing a cross-sectional structure taken along line II-II of FIG. 1.

Embodiments of the invention are described below. Matters necessary to implement the embodiments of the invention other than those specifically referred to in the invention may be understood as design matters based on the related art in the pertinent field for a person of ordinary skills in the art. The invention can be practiced based on the contents disclosed in this description and common technical knowledge in the subject field. In addition, in the following drawings, parts or portions having the same function are represented by the same reference numerals, and the repeated description thereof will not be made or will be simplified. In each drawing, a dimensional relationship (for example, length, width, or thickness) does not necessarily reflect the actual dimensional relationship.

Figure 3:
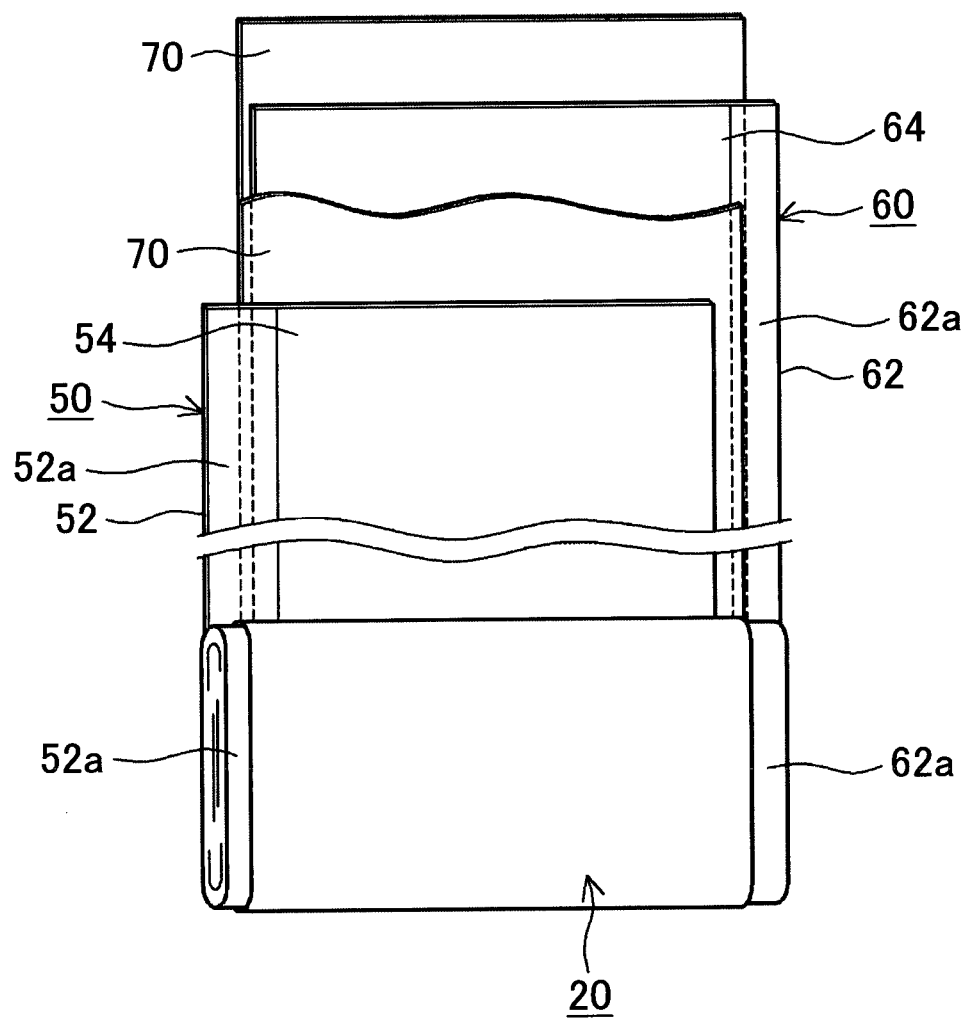
FIG. 3 is a schematic diagram showing a configuration of a wound electrode body according to the embodiment.

An electrode body for a nonaqueous electrolyte secondary battery disclosed herein can adopt the same configuration as in the related art, except that a positive electrode active material layer and a separator contain an appropriate amount of N-methylpyrrolidone (NMP). As shown in FIG. 3, the electrode body 20 includes a positive electrode 50, a negative electrode 60, and a separator 70 that electrically separates (insulates) the positive and negative electrodes from each other. Typically, the electrode body 20 may be a laminate electrode body or a wound electrode body. Hereinafter, although the invention is not particularly limited thereto, a wound electrode body 20 will be described as an example.

As shown in FIG. 3, the wound electrode body 20 according to an embodiment of the invention has an elongated sheet structure (sheet-shaped electrode body) in a step before assembly. As shown in FIG. 3, the wound electrode body 20 is formed in which a laminate is wound in a longitudinal direction. In the laminate, the positive electrode 50 and the negative electrode 60 are laminated (are disposed to overlap each other) with two elongated separators 70 interposed therebetween. In the positive electrode 50, a positive electrode active material layer 54 is formed on a single surface or both surfaces (herein, both surfaces) of an elongated positive electrode current collector 52 in the longitudinal direction. In the negative electrode 60, a negative electrode active material layer 64 is formed on a single surface or both surfaces (herein, both surfaces) of an elongated negative electrode current collector 62 in the longitudinal direction.

Although not particularly limited thereto, as shown in FIG. 3, the wound electrode body 20 may have a configuration in which the positive electrode 50, the negative electrode 60, and the separators 70 are disposed to overlap each other and are wound such that a positive electrode active material layer non-forming portion 52a (that is, a portion where the positive electrode current collector 52 is exposed without the positive electrode active material layer 54 being formed) and a negative electrode active material layer non-forming portion 62a (that is, a portion where the negative electrode current collector 62 is exposed without the negative electrode active material layer 64 being formed) protrude to the outside from opposite ends in a winding axial direction. As a result, at the center of the wound electrode body 20 in the winding axial direction, the laminate (winding core portion) is formed in which the positive electrode 50, the negative electrode 60, and the separators 70 are laminated and wound. Although not particularly limited thereto, the wound electrode body 20 may have a flat shape as shown in FIG. 3.

The electrode body 20 disclosed herein can be preferably used as an electrode body for a nonaqueous electrolyte secondary battery. Hereinafter, each component constituting the electrode body 20 will be described.

The positive electrode 50 can adopt the same configuration as in the related art, except that the positive electrode active material layer 54 contains a predetermined amount of NMP. That is, the NMP content in the positive electrode active material layer 54 is 54 ppm to 602 ppm with respect to the total solid content of the positive electrode active material layer. As a material of the positive electrode current collector 52 constituting the positive electrode 50, a conductive material formed of highly conductive metal can be preferably used as in a positive electrode current collector for a nonaqueous electrolyte secondary battery of the related art. For example, aluminum, nickel, titanium, or stainless steel, or an alloy containing the metal as a major component can be used. The shape of the positive electrode current collector 52 is not particularly limited because it may vary depending on, for example, the shape of the electrode body and the shape of a battery (nonaqueous electrolyte secondary battery) in which the electrode body is used. For example, the positive electrode current collector 52 may have various shapes such as a rod shape, a plate shape, a sheet shape, and a foil shape.

The positive electrode active material layer 54 contains at least a positive electrode active material. As the positive electrode active material, one kind or two or more kinds may be used without any particular limitation among various known materials which can be used as a positive electrode active material of a nonaqueous electrolyte secondary battery. Preferable examples of the positive electrode active material include lithium composite metal oxides (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and $LiFePO_4$). The crystal structure of the lithium composite metal oxide may be any one of a layered structure, a spinel structure, or an olivine structure. A lithium composite metal oxide having a layered crystal structure (typically a layered rock-salt type structure belonging to the hexagonal system) is preferable because it has high energy density. For example, a lithium composite metal oxide having a layered crystal structure which contains at least one of Ni, Co, and Mn in addition to Li as a constituent element is preferable. In particular, a lithium composite metal oxide having a layered structure which contains at least Ni is preferable as the positive electrode active material. Further, a lithium composite metal oxide containing Ni, Co, and Mn (that is, lithium nickel cobalt manganese composite oxide; hereinafter also referred to as "LNCM oxide") can be preferably used because it has relatively high thermal stability and high energy density. Examples of the lithium composite metal oxide containing Ni, Co, and Mn include a lithium composite metal oxide containing the three transition metal elements in substantially the same amount; and a lithium composite metal oxide containing Ni in an amount of 50 mol % or higher and containing Co and Mn in substantially the same amount.

In addition to the above-described exemplary constituent elements (for example, Li, Ni, Co, and Mn), the positive electrode active material disclosed herein may further contain one element or two or more elements as an additional constituent element M. Examples of the additional element M include, in the periodic table, a Group 1 element (alkali metal such as sodium), a Group 2 element (alkali earth metal such as magnesium or calcium), a Group 4 element (transition metal such as titanium or zirconium), a Group 6 element (transition metal such as chromium or tungsten), a Group 8 element (transition metals such as iron), a Group 13 element (boron as a metalloid element or metal such as aluminum), and a Group 17 element (halogen such as fluorine). Typical examples of the additional constituent element M include Zr, W, Mg, Ca, Na, Fe, Cr, Zn, Si, Sn, Al, B, and F.

As a preferable example of the positive electrode active material which can be used in the technique disclosed herein, a lithium composite metal oxide having a layered structure which has a composition (average composition) represented by the following Formula (I) can be used.

$$Li_{1+x}Ni_yCo_zMn_{(1-y-z)})M_\gamma O_2 \quad (I)$$

In the formula (I), x may represent a real number which satisfies $0 \leq x \leq 0.2$. y may represent a real number which satisfies $0.1 < y < 0.9$. z may represent a real number which satisfies $0.1 < z < 0.4$. $\gamma$ may satisfy $0 \leq \gamma \leq 0.03$. y and z satisfy the following relationship of $0 < (1-y-z)$. M represents one element or two or more elements selected from the group consisting of Zr, W, Mg, Ca, Na, Fe, Cr, Zn, Si, Sn, Al, B, and F. In the chemical formula representing the lithium composite metal oxide having a layered structure described in this specification, the composition ratio of O (oxygen) is 2. However, this numerical value may not be exactly 2, and a small variation in the composition (typically, in a range of 1.95 to 2.05) is allowable.

In addition to the positive electrode active material, the positive electrode active material layer 54 optionally contains one material or two or more materials which can be used as components of a positive electrode active material layer in a general nonaqueous electrolyte secondary battery. Examples of the material include a conductive material and a binder. As the conductive material, for example, carbon materials such as various carbon blacks (for example, acetylene black and Ketjen black), coke, activated carbon, graphite, carbon fiber, and carbon nanotube can be preferably used. In addition, as the binder, for example, a polymer material such as polyvinylidene fluoride (PVdF) or polyethylene oxide (PEO) can be preferably used.

A ratio of the mass of the positive electrode active material to the total mass of the positive electrode active material layer 54 is suitably about 60 mass % or more (typically, 60 mass % to 99 mass %) and is usually preferably about 70 mass % to 95 mass %. When the conductive material is used, a ratio of the mass of the conductive material to the total mass of the positive electrode active material layer 54 is, for example, about 2 mass % to 20 mass % and is usually preferably about 3 mass % to 10 mass %. When the binder is used, a ratio of the mass of the binder to the total mass of the positive electrode active material layer 54 is, for example, about 0.01 mass % to 10 mass % and is usually preferably about 0.1 mass % to 2 mass %.

The mass (mass per unit area) of the positive electrode active material layer 54 provided per unit area of a single surface of the positive electrode current collector 52 may be 2 mg/cm$^2$ or more (for example, 4 mg/cm$^2$ or more; typically 5 mg/cm$^2$ or more) in a dry state of the positive electrode active material layer 54 from the viewpoint of securing a sufficient battery capacity. From the viewpoint of securing battery characteristics (for example, input and output characteristics), the mass of the positive electrode active material layer 54 provided per unit area of a single surface of the positive electrode current collector 52 may be 50 mg/cm$^2$ or less (for example, 30 mg/cm$^2$ or less; typically 10 mg/cm$^2$ or less). As a result, the effects of the invention can be exhibited at a higher level. When the positive electrode active material layer 54 is provided on both surfaces of the positive electrode current collector 52 as in the embodiment, it is preferable that the masses of the positive electrode active material layers 54 provided on the respective surfaces of the positive electrode current collector 52 are substantially the same. That is, the total mass per unit area of the positive electrode active material layers 54 provided on the surfaces of the positive electrode current collector 52 (the masses of the positive electrode active material layers 54 provided per unit area of the positive electrode current collector 52) may be 4 mg/cm$^2$ or more (for example, 8 mg/cm$^2$ or more; typically 10 mg/cm$^2$ or more) and may be 100 mg/cm$^2$ or less (for example, 60 mg/cm$^2$ or less; typically 20 mg/cm$^2$ or less) in a dry state of the positive electrode active material layers 54. For example, the total mass per unit area may be 11±2 mg/cm$^2$. The mass per unit area of the positive electrode active material layer 54 (when the positive electrode active material layer 54 is provided on both surfaces of the positive electrode current collector, the sum of the mass per unit area of the positive electrode active material layers 54 provided on the surfaces) can be calculated as the mass (mg/cm$^2$) of the total solid content per unit area of the positive electrode active material layer 54.

The average thickness of the positive electrode active material layer 54 per single surface may be, for example, 20 μm or more (typically 40 μm or more, preferably 50 μm or more) and may be, for example, 100 μm or less (typically 80 μm or less). The density of the positive electrode active material layer 54 may be, for example, 1 g/cm$^3$ to 4 g/cm$^3$ (typically 1.5 g/cm$^3$ to 3.5 g/cm$^3$; preferably 1.8 g/cm$^3$ to 2.4 g/cm$^3$). The porosity of the positive electrode active material layer 54 may be typically 10 vol % to 50 vol % (typically, 20 vol % to 40 vol %). When one or two or more of the characteristics are satisfied, an appropriate amount of pores can be secured in the positive electrode active material layer 54, and the nonaqueous electrolytic solution can be sufficiently impregnated into the positive electrode active material layer 54. Therefore, a reaction field with charge carriers can be widely ensured, and high input and output characteristics can be exhibited. Further, the conductivity in the positive electrode active material layer 54 can be maintained at a high level, and an increase in resistance can be suppressed. Further, the mechanical strength (shape retaining ability) of the positive electrode active material layer 54 can be secured, and superior cycle characteristics can be exhibited. Therefore, within the above-described range, high levels of output characteristics and energy density of a nonaqueous electrolyte secondary battery can be simultaneously realized.

In this specification, "porosity" refers to a value which is obtained by dividing a total pore volume (cm$^3$) by the apparent volume (cm$^3$) of an active material layer and multiplying the divided value by 100, the total pore volume being obtained by measurement using a mercury porosimeter. The apparent volume can be calculated as the product of the area (cm$^2$) in a plan view and the thickness (cm). Specifically, first, a positive electrode sheet as a measurement object is cut into a square shape or a rectangular shape using a punching machine, a cutter, or the like. Next, the area (cm$^2$) in a plan view and the thickness (cm) of the positive electrode active material layer of the cut sample are measured, and these values are multiplied so as to calculate the apparent volume. The thickness can be measured using, for example, a micrometer or a thickness meter (for example, a rotary caliper meter).

The characteristics (that is, average thickness, density, and porosity) of the positive electrode active material layer 54 can be adjusted, for example, by forming the positive electrode active material layer 54 on the positive electrode current collector 52 and then performing an appropriate pressing treatment on the positive electrode 50. In the pressing treatment, for example, various well-known press methods such as a roll press method or a flat plate press method can be adopted. In addition, the pressing treatment may be performed once or two or more times.

The negative electrode 60 disclosed herein can adopt the same configuration as in a nonaqueous electrolyte secondary battery of the related art without any particular limitation. As a material of the negative electrode current collector 62 constituting the negative electrode 60, a conductive material formed of highly conductive metal can be preferably used as in a current collector of a negative electrode for a nonaqueous electrolyte secondary battery of the related art. For example, copper, nickel, titanium, or stainless steel, or an alloy containing the metal as a major component can be used. The shape of the negative electrode current collector 62 is not particularly limited because it may vary depending on, for example, the shape of the electrode body and the shape of a battery (nonaqueous electrolyte secondary battery) in which the electrode body is used. For example, the negative electrode current collector 62 may have various shapes such as a rod shape, a plate shape, a sheet shape, and a foil shape.

The negative electrode active material layer 64 contains at least a negative electrode active material. As the negative electrode active material, one kind or two or more kinds may be used without any particular limitation among various known materials which can be used as a negative electrode active material of a nonaqueous electrolyte secondary battery. For example, a particulate carbon material (carbon particles) at least a part of which has a graphite structure (layered structure) can be preferably used. For example, various carbon materials such as graphite, non-graphitizable carbon (hard carbon), graphitizable carbon (soft carbon), and a carbon material having a combination thereof can be preferably used. Among these, graphite particles (formed of natural graphite or artificial graphite) capable of obtaining high energy density can be preferably used. In addition, a surface of the carbon material (carbon material as a core) may be coated with an amorphous carbon film. For example, by coating a surface of a graphite carbon material with an amorphous carbon having low reactivity with an electrolytic solution, a decrease in battery capacity and an increase in battery resistance, which may be caused when an edge portion of the graphite material (typically, an end of a basal plane of graphite) reacts (typically, is reduced and decomposed) with a nonaqueous electrolytic solution (typically, a nonaqueous solvent contained in the electrolytic solution), can be suppressed.

The carbon material (composite carbon material) whose surface is coated with an amorphous carbon film can be prepared, for example, using a general gas-phase method (dry method) or a liquid-phase method (wet method). For example, the composite carbon material can be prepared using a method including: mixing a carbon material (typically, a graphite material) as a core and a carbonizable material (coating material) such as pitch or tar as a precursor of amorphous carbon with each other in an appropriate solvent such that the coating material is attached to surfaces of graphite particles; and firing the obtained mixture at a temperature, at which the graphitization of the coating material does not progress, such that the coating material attached to the surfaces are sintered. A mixing ratio of the carbon material (typically, a graphite material) as a core to the coating material can be appropriately determined based on the kind and characteristics (for example average particle size) of the carbon material to be used. The firing temperature can be adjusted to be, for example, 500° C. to 1500° C. (typically, 800° C. to 1300° C.).

The form of the negative electrode active material is not particularly limited but may be, for example, a particulate or powder form. The average particle size of the negative electrode active material in a particulate form may be 20 μm or less (typically, 1 μm to 20 μm; for example, 5 μm to 20 μm). The negative electrode active material which satisfies the above-described particle size range can form a preferable conductive path in the active material layer containing the active material. Therefore, battery performance (for example, rated capacity or output characteristics) can be further improved.

In this specification, "average particle size" refers to a particle size (also referred to as "$D_{50}$ particle size" or "median size") corresponding to a cumulative value of 50% in order from the smallest particle size in a volume particle size distribution which is obtained by particle size distribution measurement based on a general laser diffraction laser scattering method.

The specific surface area of the negative electrode active material is not particularly limited. However, for example, the BET specific surface area of the negative electrode active material which is measured using krypton (Kr) as an adsorption gas (hereinafter, also referred to as "Kr BET specific surface area ($m^2/g$)") may be 2.0 $m^2/g$ to 6.0 $m^2/g$ (preferably 2.8 $m^2/g$ to 5.1 $m^2/g$). The Kr BET specific surface area refers to a value obtained by analyzing a gas adsorption amount using a BET method (for example, a one-point BET method), the gas adsorption amount being measured using a gas adsorption method (constant-volume adsorption method) in which Kr gas is used as an adsorption gas. The negative electrode active material in which the Kr BET specific surface area satisfies the above-described range has an area which is preferable as a physical adsorption area of lithium ions and thus can preferably store lithium ions even under a high load (for example, during high-current charging). In addition, the decomposition of the nonaqueous electrolytic solution on the surface of the negative electrode active material can be suitably suppressed. Therefore, high battery characteristics (for example, high input and output characteristics) and high durability can be exhibited.

The negative electrode active material layer 64 may further contain components other than the active material, for example, a binder or a thickener. As the binder, for example, various polymer materials such as styrene-butadiene rubber (SBR) may be used. As the thickener, for example, various polymer materials such as carboxymethyl cellulose (CMC) may be used.

It is preferable that a ratio of the mass of the negative electrode active material to the total mass of the negative electrode active material layer 64 is suitably about 50 mass % or more and is usually preferably about 90 mass % to 99 mass % (typically, 95 mass % to 99 mass %). When the binder is used, a ratio of the mass of the binder to the total mass of the negative electrode active material layer 64 is, for example, about 0.5 mass % to 10 mass % and is usually preferably about 0.5 mass % to 5 mass %.

The mass (mass per unit area) of the negative electrode active material layer 64 provided per unit area of a single surface of the negative electrode current collector 62 may be, for example, about 2 $mg/cm^2$ to 10 $mg/cm^2$ (typically, 3 $mg/cm^2$ to 7 $mg/cm^2$). When the negative electrode active material layer 64 is provided on both surfaces of the negative electrode current collector 62 as in the embodiment, it is preferable that the masses of the negative electrode active material layers 64 provided on the respective surfaces of the negative electrode current collector 62 are substantially the same.

The porosity of the negative electrode active material layer 64 may be, for example, about 5 vol % to 50 vol % (preferably 35 vol % to 50 vol %). The thickness (average thickness) of the negative electrode active material layer 64 per single surface may be, for example, 40 μm or more (typically, 50 μm or more) and may be, for example, 100 μm or less (typically, 80 μm or less). The density of the negative electrode active material layer 64 may be, for example, about 0.5 $g/cm^3$ to 2 $g/cm^3$ (typically, 0.9 $g/cm^3$ to 1.3 $g/cm^3$). By adjusting the characteristics of the negative electrode active material layer 64 to be within the above-described ranges, an interface with the nonaqueous electrolytic solution can be suitably maintained, and high levels of durability (cycle characteristics) and input and output characteristics during normal use can be simultaneously realized.

The negative electrode 60 can be formed, for example, using a method including: dispersing the negative electrode active material and other optional materials in an appropriate solvent (for example, ion exchange water) to prepare a paste (slurry) composition; applying an appropriate amount of the composition to a surface of the negative electrode current collector 62; and drying the composition to remove the solvent. In addition, by optionally performing an appropriate pressing treatment, the characteristics (for example, average thickness, active material density, and porosity) of the negative electrode active material layer 64 can be adjusted. In the pressing treatment, for example, various well-known press methods such as a roll press method or a flat plate press method can be adopted.

Although not limited thereto, a ratio ($C_a/C_c$) of a negative electrode capacity ($C_a$) to a positive electrode capacity ($C_c$) is, for example, suitably 1.0 to 2.5 (preferably 1.5 to 2.0), the positive electrode capacity ($C_c$) being defined as a product of the theoretical capacity of the positive electrode active material per unit mass and the mass of the positive electrode active material, and the negative electrode capacity ($C_a$) being defined as a product of the theoretical capacity of the negative electrode active material per unit mass and the mass of the negative electrode active material. The capacity ratio of the positive electrode and the negative electrode facing each other may have a direct effect on battery capacity (or irreversible capacity) or energy density. When $C_a/C_c$ is excessively low, there may be a case in that, for example, a material (typically, lithium metal) derived from charge carriers is likely to be deposited depending on use conditions and the like (for example, rapid charging) of the battery. On the other hand, when $C_a/C_c$ is excessively high, the energy density of the battery is likely to decrease. By adjusting the capacity ratio of the positive and negative electrodes facing each other to be within the above-described range, battery characteristics such as battery capacity and energy density can be maintained at a high level, and the deposition of a material (typically, lithium metal) derived from charge carriers can be suitably suppressed.

The separator 70 can adopt the same configuration as in the related art, except that it contains a predetermined amount of NMP. That is, the NMP content in the separator 70 is 10 ppm to 26 ppm with respect to the total solid content of the positive electrode active material layer. Here, "NMP content in the separator with respect to the total solid content of the positive electrode active material layer" can be obtained by dividing the amount (g/m$^2$) of NMP contained per unit area of the separator by the mass (g/m$^2$) of the positive electrode active material layer provided per unit area of the positive electrode current collector, that is, the mass per unit area (g/m$^2$) of the positive electrode active material layer. When the positive electrode active material layer is provided on both surfaces of the positive electrode current collector, "mass per unit area of the positive electrode active material layer" refers to the total mass per unit area of the positive electrode active material layers provided on the surfaces of the positive electrode current collector.

The separator 70 interposed between the positive electrode 50 and the negative electrode 60 is not particularly limited as long as it insulates the positive electrode active material layer 54 and the negative electrode active material layer 64 from each other and has a function of holding the nonaqueous electrolytic solution and a shutdown function. The shape of the separator 70 is not particularly limited because it may vary depending on, for example, the shape of the electrode body and the shape of a battery (nonaqueous electrolyte secondary battery) in which the electrode body is used. For example, the separator 70 may have various shapes such as a rod shape, a plate shape, a sheet shape, and a foil shape. The separator 70 may be a separator formed of only a resin separator substrate. In addition, the separator may be a heat-resistant separator including a porous heat resistance layer on a single surface or both surfaces (typically, a single surface) of the resin separator substrate (substrate layer). The heat resistance layer may be formed on the entire surface of the substrate layer, that is, the entire region of the substrate layer in a longitudinal direction and a width direction thereof.

Preferable examples of the separator substrate (substrate layer) include a porous resin sheet formed of a resin such as polyethylene (PE), polypropylene (PP), polyester, cellulose, or polyamide. Among these, a polyolefin-based porous resin (for example, PE or PP) has a shutdown temperature of 80° C. to 140° C. (typically 110° C. to 140° C.; for example, 120° C. to 135° C.) sufficiently lower than the heat resistance temperature (typically, about 200° C. or higher) of a battery, and thus can exhibit the shutdown function at an appropriate timing.

The separator substrate (substrate layer) may have a single-layer structure formed of one porous resin or a structure in which two or more porous resin sheets formed of different materials or having different characteristics (for example, thickness or porosity) are laminated. As the separator substrate having the multi-layer structure, for example, a separator substrate (substrate layer) having a three-layer structure (that is, a three-layer structure of PP/PE/PP) in which a polypropylene (PP) layer is laminated on both surfaces of a polyethylene (PE) layer can be preferably used. The two separators 70 included in the wound electrode body 20 may be formed of different materials or may have different characteristics.

The average thickness of the separator substrate (substrate layer) is not particularly limited, but is usually 5 μm or more (typically 10 μm or more; for example 17 μm or more) and is 40 μm or less (typically 30 μm or less; for example, 25 μm or less). When the thickness of the substrate layer is within the above-described range, the insulating function and the function of holding the electrolyte can be suitably exhibited, and far superior ion permeability can be maintained. Therefore, far superior battery performance can be realized. The thickness of the substrate layer can be obtained, for example, by measurement using a micrometer or a thickness meter or by analysis of a cross-sectional SEM image.

The porosity of the separator substrate (substrate layer) is not particularly limited but, for example, is preferably about 20 vol % to 70 vol % and more preferably about 30 vol % to 60 vol %. When the porosity of the substrate layer is excessively high, mechanical strength may be insufficient, or thermal shrinkage may be significant. On the other hand, when the porosity is excessively low, the amount of the electrolytic solution which can be held in the substrate layer may decrease, or charging-discharging characteristics may decrease due to reduced ion permeability. Therefore, by adjusting the porosity of the substrate layer to be within the above-described range, high strength and superior insulating properties may be exhibited, and battery performance (for example, ion permeability or input and output characteristics) may be further improved. The porosity of the substrate layer can be adjusted, for example, by adjusting the kind of a constituent material or the strength during drawing.

The porosity of the separator substrate (substrate layer) can be obtained from the expression "$[1-(W/\rho V)] \times 100$" based on the mass W (g), the apparent volume (cm$^3$), and the true density ρ (g/cm$^3$). "Apparent volume" can be calculated as the product of the area (cm$^2$) in a plan view and the thickness (cm). "True density ρ" can be measured using a density meter according to a general constant volume dilatometric method (gas displacement pycnometry).

The air permeability (Gurley value) of the separator substrate (substrate layer) is not particularly limited, but is usually 100 sec/100 mL or more (typically 200 sec/100 mL or more) and is usually 1000 sec/100 mL or less (typically 600 sec/100 mL or less). The air permeability defines the average pore size in a pseudo manner, and when the air permeability is excessively low, input and output characteristics may decrease due to reduced ion permeability. When the air permeability is excessively high, for example, in a case where a porous heat resistance layer described below is formed on the separator substrate, an excess amount of an inorganic filler contained in the porous heat resistance layer penetrates into the pores of the separator. As a result, ion permeability or input and output characteristics may decrease. Here "air permeability" refers to air permeability resistance (Gurley) and can be measured according to a method defined by JIS P8117 (2009).

When a heat resistance layer is provided on the separator Substrate (substrate layer), the heat resistance layer may have the same configuration as that of a heat resistance layer of a separator which is used in a nonaqueous electrolyte secondary battery of the related art without any particular limitation. Even when the internal temperature of a battery becomes high (for example, 150° C. or higher; typically 200° C. or higher) due to, for example, internal short-circuiting, the heat resistance layer may have a shape retaining ability (which can allow a small amount of deformation) without being softened or melted. This heat resistance layer may be, for example, a layer containing an inorganic filler and a binder. Examples of the inorganic filler contained in the heat resistance layer include a metal oxide and a metal hydroxide. As the inorganic filler, for example, alumina, boehmite, silica, titania, calcia, magnesia, zirconia, boron nitride, or aluminum nitride can be preferably used. Among these inorganic fillers, one kind can be used alone, or two or more kinds can be used in combination. As the binder contained in the heat resistance layer, for example, an acrylic resin, polytetrafluoroethylene (PTFE), polyvinylidene fluoride (PVdF), carboxymethyl cellulose (CMC), or methyl cellulose (MC) can be preferably used. Among these binders, one kind can be used alone, or two or more kinds can be used in combination. In particular, an acrylic resin is preferable because it can exhibit high shape retaining ability due to strong adhesion (typically, initial tackiness or adhesion strength) and high electrochemical stability thereof.

In addition to the filler and the binder, the heat resistance layer optionally contains one material or two or more materials which can be used as components of a heat resistance layer in a general secondary battery. Examples of the material include various additives such as a thickener or a dispersant.

The average thickness of the heat resistance layer is not particularly limited but may be, for example, 1 μm or more (typically, 3 μm or more). By adjusting the thickness of the heat resistance layer to be within the above-described range, internal short-circuiting can be suitably prevented, and a high short-circuiting prevention effect can be exhibited. The upper limit is not particularly limited but may be, for example, 10 μm or less (typically 5 μm or less). When the thickness of the heat resistance layer is excessively small, a sufficient heat resistance effect cannot be exhibited, and the short-circuiting prevention effect may decrease. When the average thickness of the heat resistance layer satisfies the above-described range, higher levels of battery performance and reliability can be simultaneously realized, and the effects of the invention can be exhibited at a higher level.

When the total porosity of the heat resistance layer is not particularly limited but may be, for example, 50 vol % to 70 vol %. When the porosity of the heat resistance layer is excessively high, mechanical strength may be insufficient. When the porosity of the heat resistance layer is excessively low, resistance may increase due to reduced ion permeability, or input and output characteristics may decrease. Within the above-described range, the effects of the invention can be exhibited at a higher level.

Here, when the heat resistance layer is formed on both surfaces of the substrate layer, the characteristics of the heat resistance layer formed on a surface facing the positive electrode may be the same as those of the heat resistance layer formed on a surface facing the negative electrode. Alternatively, there may be a difference in, for example, the kind and proportion of the filler contained, the porosity, or the average thickness. When the heat resistance layer is formed on a single surface of the substrate layer, the heat resistance layer may face the positive electrode (positive electrode active material layer) or the negative electrode (negative electrode active material layer).

The separator in which the heat resistance layer is formed on at least one surface of the substrate layer can be manufactured, for example, using the following method. First, the filler, the binder, and other optional materials are dispersed in an appropriate solvent to prepare a paste-like (slurry-like) heat resistance layer-forming composition. Next, the heat resistance layer-forming composition is applied to a surface of the substrate layer and is dried to remove the solvent. As a result, a separator in which a heat resistance layer having the above-described characteristics is formed on the substrate layer can be manufactured.

Hereinafter, in regard to a method of manufacturing an electrode body according to the invention, a preferable embodiment of a method of manufacturing the wound electrode body 20 having the above-described configuration will be described appropriately with reference to the drawings. However, the method of manufacturing an electrode body according to the invention is not intended to be limited to the following embodiment.

Figure 4:
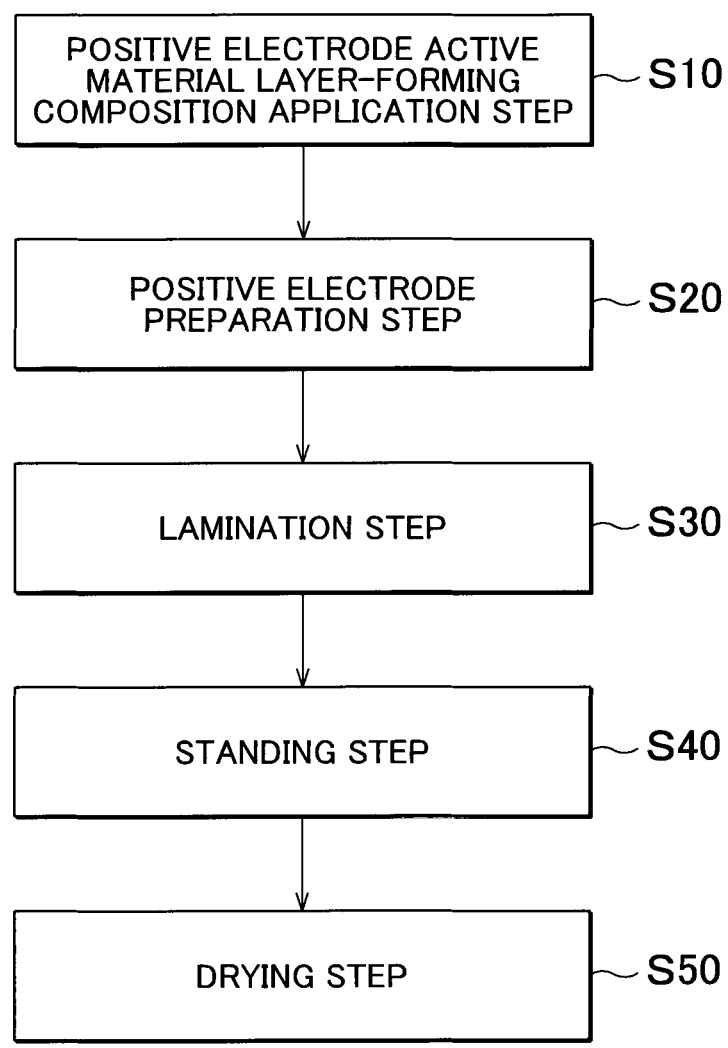
FIG. 4 is a flowchart showing a method of manufacturing an electrode body disclosed herein.

As shown in FIG. 4, the method of manufacturing the wound electrode body 20 disclosed herein includes a positive electrode active material layer-forming composition application step (S10), a positive electrode preparation step (S20), a lamination step (S30), a standing step (S40), and a drying step (S50). Hereinafter, the respective steps will be described in detail.

First, the positive electrode active material layer-forming composition application step (S10) will be described. In this step, a positive electrode active material layer-forming composition is prepared, and the positive electrode active material layer-forming composition is applied to the positive electrode current collector 52. The positive electrode active material layer-forming composition contains a positive electrode active material and NMP. Typically, the positive electrode active material layer-forming composition may be a paste-like or slurry-like composition. The positive electrode active material layer-forming composition can be prepared by dispersing the positive electrode active material and other optional materials in NMP. Here, as the dispersing method, a well-known method of the related art can be used without any particular limitation. In addition, since the dispersing method is not a characteristic of the invention, the detailed description thereof will not be made. An appropriate amount of the positive electrode active material layer-forming composition prepared as described above is applied to a surface (a single surface or both surfaces) of the positive electrode current collector 52. The operation of applying the positive electrode active material layer-forming composition is not particularly limited and can be performed, for example, using an appropriate coater such as a gravure coater, a slit coater, a die coater, a comma coater, or a dip coater.

Next, the positive electrode preparation step (S20) will be described. In this step, the positive electrode current collector 52 to which the positive electrode active material layer-forming composition is applied in the positive electrode active material layer-forming composition application step (S10) is dried by, preferably, air drying, heating, pressure reduction, or the like to remove the solvent (typically, NMP) or water contained in the positive electrode active material layer-forming composition. As a result, the positive electrode 50 in which the positive electrode active material layer 54 is formed on the positive electrode current collector 52 is prepared.

"Removal" described herein is not a concept in which the solvent is completely removed (does not completely disappear) but a concept in which the remaining amount of the solvent is adjusted to be a predetermined standard amount or less. That is, the positive electrode active material layer 54 of the positive electrode 50 prepared in this step contains a predetermined amount of NMP. In the positive electrode active material layer 54, a part of NMP used for preparing the positive electrode active material layer-forming composition remains. Accordingly, the drying treatment can also be called an NMP content adjusting treatment of adding an appropriate amount of NMP to the positive electrode active material layer.

The NMP content in the positive electrode active material layer 54 of the positive electrode before the lamination step and after the positive electrode preparation step (S20) is preferably set to be, for example, within a range of 80 ppm to 1010 ppm (preferably 89 ppm to 1004 ppm) with respect to the total solid content of the positive electrode active material layer. By adjusting the NMP content in the positive electrode active material layer 54 to be within the above-described range, an appropriate amount of NMP can be moved into the separator 70 in a state where the positive electrode active material layer 54 contains an appropriate amount of NMP. That is, it is preferable that the positive electrode having the above-described NMP content in the positive electrode active material layer 54 is used because the electrode body 20 in which the separator 70 and the positive electrode active material layer 54 contains a predetermined amount of NMP can be constructed.

The drying operation is not particularly limited and can be performed using general means of the related art (for example, heating drying or reduced-pressure drying). For example, heating drying is preferably used from the viewpoint of manufacturing efficiency. From the viewpoint of efficiently performing drying within a short period of time, hot air drying is preferable in which hot air having a predetermined temperature is blown to the positive electrode active material layer-forming composition.

The drying temperature can be set to a temperature at which components (typically, the positive electrode active material, the conductive material, the binder, and the like) constituting the positive electrode active material layer are not modified. Typically, it is preferable that the heating drying is performed at a temperature lower than a melting point of a material (typically, the binder) having the lowest melting point among the components constituting the positive electrode active material layer. For example, the drying temperature can be set to be about 120° C. to 200° C. (preferably, 125° C. to 160° C.).

Blowing conditions of the hot air drying are not particularly limited. However, in general, it is preferable that hot air is blown at a flow rate of 10 m$^3$/min to 60 m$^3$/min (typically 25 m$^3$/min to 50 m$^3$/min; for example, about 50 m$^3$/min±5 m$^3$/min). As the flow rate for the hot air drying increases, the solvent (typically, NMP) in the positive electrode active material layer-forming composition can be more efficiently evaporated. On the other hand, as the flow rate (that is, a rate at which external air flows in) for the hot air drying increases, a load is applied to temperature adjusting equipment (typically, a heater) or air conditioning equipment. Therefore, from the viewpoint of the manufacturing cost of the electrode body, it is preferable that drying is performed at a low flow rate.

The drying time may be appropriately adjusted depending on the conditions such as the drying temperature or the flow rate for the hot air drying such that the NMP content in the positive electrode active material layer 54 is within the predetermined range. Usually, the drying time may be 10 seconds to 300 seconds (typically, 20 seconds to 200 seconds; for example, 30 seconds to 100 seconds). For example, when hot air drying is performed under a temperature condition of 125° C. to 160° C. at a flow rate of about 50 m$^3$/min±5 m$^3$/min, the drying time may be set to be about 20 seconds to 50 seconds (for example, about 36 seconds±2 seconds). As a result, drying (removal of the solvent) can be performed in a state where an appropriate amount of NMP remains in the positive electrode active material layer 54.

The positive electrode preparation step (S20) may further contain a pressing treatment. By optionally performing an appropriate pressing treatment, the characteristics (for example, average thickness, active material density, and porosity) of the positive electrode active material layer 54 can be adjusted.

Next, the lamination step (S30) will be described. In the lamination step, the positive electrode 50 prepared in the positive electrode preparation step (S20) and the negative electrode 60 are laminated with the separators 70 interposed therebetween to prepare a laminate. As the negative electrode 60 and the separator 70, a negative electrode and a separator which are used in a nonaqueous electrolyte secondary battery of the related art can be used without any particular limitation. For example, the negative electrode 60 and the separator 70 may have the above-described configurations.

Although not intended to be limited thereto, as shown in FIG. 3, the laminate may be a wound laminate 20 which is formed into a flat shape and in which the positive electrode active material layer non-forming portion 52a or the negative electrode active material layer non-forming portion 62a protrudes from opposite ends in a winding axial direction. The wound laminate 20 can be prepared by disposing the elongated positive electrode 50 and the elongated negative electrode 60 to overlap each other in a longitudinal direction thereof with the two elongated separators 70 and winding the laminate. After the positive and negative electrodes and the separators are disposed to overlap each other and wound, the wound body is squashed from the side surface thereof so as to be formed into a flat shape.

Next, the standing step (S40) will be described. In the standing step, the laminate 20 prepared in the lamination step (S30) is left to stand for a predetermined amount of time. By performing the standing step, a part of NMP contained in the positive electrode active material layer 54 can be moved into the separator 70. That is, the separator 70 after the standing step contains NMP.

In the standing step (S40), standing conditions of the laminate 20 are not particularly limited as long as an appropriate amount of NMP can be moved (transferred) from the positive electrode active material layer into the separator such that the NMP content in the positive electrode active material layer 54 after the drying step (S50) is 54 ppm to 602 ppm with respect to the total solid content of the positive electrode active material layer; and the NMP content in the separator after the drying step (S50) is 10 ppm to 26 ppm with respect to the total solid content of the positive electrode active material layer.

The temperature of an environment in which the laminate 20 is left to stand can be set to be, for example, 5° C. to 35° C., preferably 15° C. to 30° C., and more preferably about 25° C.±3° C. Typically, the laminate 20 may be left to stand at normal temperature (20° C.±15° C.). When the standing temperature is excessively high, NMP contained in the positive electrode active material layer 54 may be evaporated in air. On the other hand, when the standing temperature is excessively low, the efficiency of moving (transferring) NMP contained in the positive electrode active material layer 54 into the separator may decrease. The humidity (relative humidity) of the environment in which the laminate 20 is left to stand is not particularly limited. For example, it is preferable that the laminate 20 is left to stand in an environment of normal humidity (45% rh to 85% rh) or typically in an environment of 50% rh to 65% rh. By standing of the laminate 20 to stand in an environment satisfying the temperature range and the humidity range for the predetermined amount of time, a desirable amount of NMP can be moved from the positive electrode active material layer 54 into the separator 70. Since the evaporation of an excess amount of NMP from the positive electrode active material layer 54 can be suppressed, a desirable amount of NMP can be maintained in the positive electrode active material layer 54.

The speed (transfer efficiency) of moving NMP from the positive electrode active material layer 54 into the separator 70 may vary depending on the environment (for example, temperature and humidity) in which the laminate 20 is left to stand. Therefore, the time for which the laminate 20 is left to stand is not particularly limited. In general, as the standing time increases, the amount of NMP moved into the separator can be increased. Typically, when the laminate 20 is left to stand in the above-described normal-temperature and normal-humidity environment, an appropriate amount of NMP can be moved into the separator by setting the time for which the laminate 20 is left to stand to be 1 hour to 2 hours.

Next, the drying step (S50) will be described. In the drying step, the laminate 20 after the standing step (S40) is dried. By performing the drying step, the NMP contents in the positive electrode active material layer 54 and the separator 70 can be adjusted. That is, the drying step is performed such that the NMP content in the positive electrode active material layer 54 is 54 ppm to 602 ppm with respect to the total solid content of the positive electrode active material layer; and the NMP content in the separator 70 is 10 ppm to 26 ppm with respect to the total solid content of the positive electrode active material layer.

The drying operation is not particularly limited and can be performed using general means of the related art (for example, heating drying or reduced-pressure drying). In the laminate 20, since uneven drying is likely to occur at the center and an end of a lamination surface, means for uniformly drying the entire region of the laminate 20 is preferable. For example, vacuum drying (reduced-pressure drying) is preferable because even the inside of the laminate (typically, the wound laminate) can be substantially uniformly dried. In particular, in the wound laminate 20, since uneven drying is likely to occur at the center and an end thereof in a winding axial direction, the vacuum drying (reduced-pressure drying) can be preferably used. For example, it is preferable that the laminate 20 is dried in a reduced-pressure environment of about 0.2 kPa to 0.8 kPa (typically, about 0.5 kPa±0.1 kPa). As the pressure reduction level decreases, drying can be performed more efficiently. The drying temperature is not particularly limited. For example, it is preferable that drying is performed in a heated state. For example, it is preferable that the drying temperature is set to be within a range of 50° C. (preferably 80° C. or higher and more preferably 100° C. or higher) to the heat resistance temperature of the separator (typically, about 100° C.±10° C.). The drying time is not particularly limited because it varies depending on the pressure reduction level, the drying temperature, and the like, and can be appropriately set such that the NMP content in the positive electrode active material layer 54 and the NMP content in the separator 70 are within the appropriate ranges. For example, when the pressure is reduced to be about 0.5 kPa±0.1 kPa and when the drying temperature is about 100° C.±10° C., drying may be performed for about 8 hours.

Here, the standing step (S40) and the drying step (S50) may be performed in a state where the laminate 20 prepared in the lamination step (S30) is accommodated in an external case (that is, a battery case) during battery construction. At this time, the standing step (S40) and the drying step (S50) are performed in a state where a part (typically, an injection hole through which the electrolytic solution is injected) of the battery case is opened. From the viewpoint of protecting the electrode body (laminate) in the standing step (S40) and the drying step (S50), it is preferable that the respective steps are performed in a state where the laminate 20 is accommodated in the battery case.

Hereinafter, a preferable embodiment of the nonaqueous electrolyte secondary battery according to the invention will be described by using a lithium ion secondary battery as an example while appropriately referring to the drawings. However, the invention is not intended to be limited to the embodiment. In the following embodiment, a lithium ion secondary battery having a configuration in which a wound electrode body and a nonaqueous electrolytic solution are accommodated in a square battery case will be described as an example. The shape (external appearance and size) of the lithium ion secondary battery (nonaqueous electrolyte secondary battery) is not particularly limited. The lithium ion secondary battery is merely exemplary, and the technical idea of the invention can also be applied to other nonaqueous electrolyte secondary batteries (for example, a magnesium secondary battery) including other charge carriers (for example, magnesium ions).

The lithium ion secondary battery disclosed herein can adopt the same configuration as in the related art, except that it includes the electrode body which is a characteristic of the invention, that is, it includes an electrode body in which a positive electrode active material layer and a separator contain a predetermined amount of NMP. As the electrode body, the above-described electrode body can be used.

As shown in FIGS. 1 and 2, a lithium ion secondary battery 100 according to the embodiment is a battery having a configuration in which the electrode body 20 (typically, the flat electrode body 20) and the nonaqueous electrolyte (not shown) are accommodated in the battery case 30 (that is, the external case). The battery case 30 includes: a box-shaped (that is, a bottomed rectangular parallelepiped-shaped) case body 32 having an opening at an end (corresponding to an upper end in a normal operating state of the battery); and a lid 34 that seals the opening of the case body 32. As the material of the battery case 30, for example, a light-weight and highly thermally conductive metal material such as aluminum, stainless steel, or nickel-plated steel may be preferably used. As shown in FIGS. 1 and 2, a positive electrode terminal 42 and a negative electrode terminal 44 for external connection are provided on the lid 34. In addition, a safety valve 36 and an injection hole (not shown) through which the nonaqueous electrolytic solution is injected into the battery case 30 are provided on the lid 34. The safety valve 36 is set to release an internal pressure of the battery case 30 when the internal pressure increases to be a predetermined level or higher. In the battery case 30, the lid 34 is welded to the periphery of an opening of the case body 32 of the battery case. As a result, the case body 32 and the lid 34 of the battery case can be joined to each other (a boundary therebetween can be sealed).

As shown in FIG. 2, the wound electrode body 20 is accommodated in the battery case 30 (that is, the case body 32 of the battery case) in a posture in which a winding axis of the wound electrode body 20 lies sideways (that is, the opening is formed in the normal direction of the winding axis of the wound electrode body 20). The positive electrode active material layer non-forming portion 52a and the negative electrode active material layer non-forming portion 62a, which protrude from the winding core portion of the wound electrode body, are welded to a positive electrode current collector plate 42a and a negative electrode current collector plate 44a, respectively, so as to be electrically connected to the positive electrode terminal 42 and the negative electrode terminal 44.

In the nonaqueous electrolytic solution disclosed herein, typically, an appropriate organic solvent (nonaqueous solvent) may contain a supporting electrolyte.

As the organic solvent, various organic solvents which can be used in an electrolytic solution of a general lithium ion secondary battery, for example, aprotic solvents such as carbonates, ethers, esters, nitriles, sulfones, and lactones can be used without any limitation. Specific examples of the organic solvent include carbonates such as ethylene carbonate (EC), diethyl carbonate (DEC), dimethyl carbonate (DMC), ethyl methyl carbonate (EMC), and propylene carbonate (PC). Among these, EC having a high dielectric constant, or DMC or EMC having a high oxidation potential (wide potential window) can be preferably used. For example, it is preferable that the nonaqueous solvent contains one kind or two kinds of carbonates, and the total volume of the carbonates is preferably 60 vol % or more (more preferably 75 vol % or more, still more preferably 90 vol % or more; may be substantially 100 vol %) with respect to the total volume of the nonaqueous solvent.

As the supporting electrolyte, a supporting electrolyte which is used in an electrolytic solution of a general lithium ion secondary battery, for example, a lithium salt can be used without any particular limitation. Among these, lithium salts such as $LiPF_6$, $LiClO_4$, $LiAsF_6$, $Li(CF_3SO_2)_2N$, $LiBF_4$, and $LiCF_3SO_3$ can be preferably used. Among these supporting electrolytes, one kind can be used alone, or two or more kinds can be used in combination. In particular, $LiPF_6$ is preferable. The concentration of the supporting electrolyte is not particularly limited. However, when the concentration is extremely low, the amount of charge carriers (typically, lithium ions) contained in the nonaqueous electrolytic solution is insufficient, and the ion conductivity tends to decrease. When the concentration is extremely high, the viscosity of the nonaqueous electrolytic solution in a temperature range of room temperature or lower (for example, 0° C. to 30° C.) increases, and the ion conductivity tends to decrease. Therefore, the concentration of the supporting electrolyte is 0.1 mol/L or higher (for example, 0.8 mol/L or higher) and is 2 mol/L or lower (for example, 1.5 mol/L or lower). The concentration of the supporting electrolyte is preferably 1.1 mol/L.

The nonaqueous electrolytic solution may further contain optional components other than the nonaqueous solvent and the supporting electrolyte within a range where the effects of the invention do not significantly deteriorate. These optional components may be used for one or two or more of the purposes including: improvement of battery output performance; improvement of storability (prevention of a decrease in capacity during storage); improvement of cycle characteristics; and improvement of initial charge-discharge efficiency. Preferable examples of the additives include various additives, for example, a gas producing agent such as biphenyl (BP) or cyclohexylbenzene (CHB); a film forming agent such as oxalato complex compounds, fluorophosphates (typically, difluorophosphates; for example, lithium difluorophosphate), vinylene carbonate (VC), and fluoroethylene carbonate (FEC); a dispersant; and a thickener. Among these additives, one kind can be used alone, or two or more kinds can be used in combination. For example, the nonaqueous electrolytic solution may contain lithium difluorophosphate and/or lithium bis(oxalato)borate in each amount of 0.025 mol/L.

As described above, the electrode body disclosed herein is characterized in that it allows an appropriate amount of NMP to be present in the positive electrode active material layer over a long period of time of use after battery construction. Therefore, in the nonaqueous electrolyte secondary battery including the electrode body, an effect of improving battery performance, which is obtained by adding NMP to the positive electrode active material layer, can be maintained over a long period of time. That is, high battery performance (for example, high output characteristics) can be exhibited over a long period of time. Accordingly, due to its characteristics, the nonaqueous electrolyte secondary battery disclosed herein can be preferably used as a drive power supply mounted in a vehicle such as a plug-in hybrid vehicle (PHV), a hybrid vehicle (HV), or an electric vehicle (EV). According to the invention, there can be provided a vehicle including the nonaqueous electrolyte secondary battery disclosed herein, preferably, as a power source (typically, a battery pack in which plural secondary batteries are electrically connected to each other).

Hereinafter, several examples (test examples) relating to the invention will be described, but the examples are not intended to limit the invention.

Using the following materials and processes, nonaqueous electrolyte secondary batteries (lithium ion secondary batteries) according to Examples 1 to 28 were constructed.

A positive electrode was prepared in the following procedure. $LiNi_{0.33}Co_{0.33}Mn_{0.33}O_2$ (LNCM) as a positive electrode active material; AB as a conductive material; and PVdF as a binder were weighed at a mass ratio (LNCM: AB:PVdF) of 90:8:2. These weighed materials were mixed with N-methylpyrrolidone (NMP) to prepare a positive electrode active material layer-forming composition. The composition was applied to both surfaces of elongated aluminum foil (positive electrode current collector) having a thickness of 15 μm. At this time, the composition was uniformly applied such that a positive electrode active material layer non-forming portion having a belt shape was formed along an end in a width direction of the positive electrode current collector; and an applied surface of the positive electrode active material layer-forming composition had a belt shape (the length in the width direction: 98 mm, the length in the longitudinal direction: 3000 mm). The coating amount (application amount) of the positive electrode active material layer-forming composition was set such that the total mass (mass per unit area) of the positive electrode active material layer (the mass of the dry positive electrode active material layer) formed per unit area of both surfaces of the positive electrode current collector was 11 mg/cm$^2$. As described above, the positive electrode current collector to which the positive electrode active material layer-forming composition was applied as described above was dried under drying conditions (temperature, time) shown in Table 1 of FIG. 6. Specifically, drying was performed for 36 seconds to 72 seconds while blowing hot air at 120° C. to 160° C. at a flow rate of 50 m$^3$/min. As a result, a positive electrode active material layer was formed. Next, the positive electrode active material layer was pressed such that the density thereof was 1.8 g/cm$^3$ to 2.4 g/cm$^3$. In this way, seven kinds of positive electrodes (positive electrodes A to G) were prepared in which the positive electrode active material layer was formed on both surfaces of the positive electrode current collector and the NMP contents in the positive electrode active material layer were different. Regarding each of the positive electrodes A to G, a positive electrode for battery construction and a positive electrode for measuring the NMP content in the positive electrode active material layer were prepared.

The NMP content in the positive electrode active material layer of each of positive electrodes (positive electrodes A to G) prepared as described above was measured. Specifically, first, each of the positive electrodes was cut into three pieces having an appropriate size (here, a square shape having a size of 5 mm×5 mm). The cut positive electrode underwent an ultrasonic treatment for 30 minutes in a state of being dipped in 2 mL of acetone. As a result, NMP was extracted from the positive electrode active material layer into acetone. Next, the acetone solution into which NMP was extracted was filtered using a syringe filter. As a result, a sample for measuring the NMP content was prepared. Next, the NMP content (g) in the sample for measuring the NMP content was quantitatively analyzed by GC-MS. The analysis was performed by using a DB-WAXETR column (manufactured by Agirent; length: 30 m, inner diameter: 0.25 mm, film thickness: 0.25 μm) as a column and using m/z99 as measurement fragment ions in a selected ion monitoring (SIM) mode. Using a mass chromatograph (GC-MS-QP2010; manufactured by Shimadzu Corporation) as an analyzer, the analysis was performed under conditions of a vaporizing chamber temperature of 240° C. and an injection amount of 1 μL. Based on the obtained results, the NMP content (g) in the positive electrode (positive electrode active material layer) provided for the measurement was calculated. Next, the NMP content was divided by the area ($cm^2$) of the positive electrode (positive electrode active material layer) provided for the measurement (typically, the area ($cm^2$) of the positive electrode provided for the measurement in a plan view). As a result, the NMP content ($g/cm^2$) per unit area of the positive electrode active material layer was obtained. The NMP content ($g/cm^2$) per unit area of the positive electrode (positive electrode active material layer) was divided by the mass per unit area ($g/cm^2$) of the positive electrode active material layer. As a result, the NMP content in the positive electrode active material layer was calculated as the NMP content (ppm) with respect to the total solid content of the positive electrode active material layer. "Mass per unit area of the positive electrode active material layer" refers to the total mass per unit area of the positive electrode active material layers provided on the surfaces of the positive electrode current collector. The obtained results are shown in the item "NMP Content (ppm) in Positive Electrode Active Material Layer" of Table 1 of FIG. 6.

During the preparation of a negative electrode, negative electrode active material particles obtained by coating surfaces of graphite particles as cores with amorphous carbon were prepared. Here, the surfaces of the graphite particles were coated with amorphous carbon using a so-called wet method. Specifically, 96 mass % of commercially available natural graphite particles were mixed with 4 mass % of pitch and were fired in an inert atmosphere at 800° C. to 1300° C. for 10 hours. Next, the fired material was cooled, crushed, and was sieved. Negative electrode active material particles having an average particle size of about 5 μm to 20 μm and a Kr adsorption amount of about 2.8 $m^2/g$ to 5.1 $m^2/g$ were obtained.

The negative electrode was prepared in the following procedure. The negative electrode active material (C) prepared as described above; SBR as a binder; and CMC as a thickener were weighed at a mass ratio (C:SBR:CMC) of 98.6:0.7:0.7. The weighed materials were mixed with ion exchange water. As a result, a negative electrode active material layer-forming composition was prepared. The composition was applied to both surfaces of elongated copper foil (negative electrode current collector) having a thickness of 10 μm in a belt shape. At this time, the composition was uniformly applied such that a negative electrode active material layer non-forming portion having a belt shape was formed along an end in a width direction of the negative electrode current collector; and an applied surface of the negative electrode active material layer-forming composition had a belt shape (the length in the width direction: 102 mm, the length in the longitudinal direction: 3200 mm). The coating amount (application amount) of the negative electrode active material layer-forming composition was set such that the total mass (mass per unit area) of the negative electrode active material layer (the mass of the dry negative electrode active material layer) formed per unit area of both surfaces of the negative electrode current collector was 7.6 $mg/cm^2$. The negative electrode current collector to which the negative electrode active material layer-forming composition was applied was dried and pressed as described above. As a result, a negative electrode in which the negative electrode active material layer was formed on the negative electrode current collector was prepared. At this time, the density of the negative electrode active material layer of the obtained negative electrode was within a range of 0.9 $g/cm^3$ to 1.3 $g/cm^3$.

The separator was prepared in the following procedure. First, boehmite as an inorganic filler and CMC as a binder were weighed at a mass ratio (inorganic filler:binder) of 97:3. The weighed materials were mixed with ion exchange water. As a result, a paste-like heat resistance layer-forming composition was prepared. Next, the heat resistance layer-forming composition was applied to a single surface of a substrate sheet (average thickness: 20 μm, air permeability: 300 sec/100 mL) having a three layer structure, in which a porous polypropylene layer was formed on both surfaces of a porous polyethylene layer, and was dried. As a result, a separator in which a heat resistance layer was formed on the single surface of the separator substrate was prepared. At this time, the average total thickness of the separator was 24 μm (that is, the average thickness of the heat resistance layer was 4 μm).

Each of the positive electrodes (positive electrodes A to G), the negative electrode, and the two separators which were prepared using the above-described methods were disposed to overlap each other in the longitudinal direction. At this time, the two separators were laminated in a direction in which the heat resistance layers faced the negative electrode (negative electrode active material layer). The positive electrode and the negative electrode were disposed to overlap each other after being slightly shifted such that a part of the positive electrode active material layer non-forming portion provided in the positive electrode and a part of the negative electrode active material layer non-forming portion provided in the negative electrode protruded toward different directions in the width direction. The positive and negative electrodes and the separators which were laminated as described above were wound in the longitudinal direction. Next, the wound body was formed into a flat shape by being squashed. In this way, laminates according to Examples 1 to 28 were prepared. Here, the winding number of each of the wound laminates (the number of turns of the laminate which was folded flat) was about 29, and a ratio ($C_d/C_c$) of the negative electrode capacity (Ca) to the positive electrode capacity ($C_c$) was adjusted to be about 1.5 to 2. The positive electrodes (positive electrodes A to G) used for preparing each of the wound laminates (electrode bodies) according to the examples are shown in the item "Positive Electrode" of Table 2 of FIG. 7. Regarding each of the wound laminates according to the examples, a laminate used for battery construction and a laminate for measuring the NMP contents in the positive electrode active material layer and the separator were prepared.

Next, positive and negative electrode current collector plates were respectively welded to the end portions of the positive and negative electrode current collectors of each of the wound laminates according to the examples prepared as described above (positive and negative electrode active material layer non-forming portions protruding from opposite ends of the wound laminate in the winding axial direction). The wound laminate was accommodated in an aluminum square battery case, and a case body of the battery case was joined to a lid of the battery case. At this time, the positive and negative electrode current collector plates were electrically connected to the positive and negative electrode terminals provided on the lid of the battery case.

The battery case that accommodated the wound laminate was left to stand for a predetermined amount of time (0 hours to 4 hours). The time for which the battery cases (that is, the wound laminates) according to the examples were left to stand are shown in Table 2 of FIG. 7. The respective battery cases (that is, the wound laminates) which were left to stand for the predetermined amount of time were left to stand in an environment of 100° C. and 0.5 kPa for 8 hours and were dried. As a result, electrode bodies (wound electrode bodies) according to Examples 1 to 28 were prepared. Specifically, each of the battery cases (that is, the wound laminates) was left to stand in a drying furnace. Next, the internal pressure of the drying furnace was reduced to 0.5 kPa, and the internal temperature of the drying furnace was increased to 100° C. in 30 minutes. In a state where each of the battery cases (that is, the wound laminates) was left to stand in the drying furnace after being dried for 8 hours, the internal temperature of the drying furnace was decreased to 40° C. in 24 hours.

After the drying, the laminate (that is, the wound electrode body) was disassembled, and the NMP content in the positive electrode active material layer and the NMP content in the separator were measured using the following method.

The NMP content in the positive electrode active material layer was analyzed using the same method as in the case of measuring the NMP content in the positive electrode active material layer of each of the positive electrodes A to G (that is, the positive electrodes before forming the laminate (wound electrode body)). That is, regarding each of the positive electrodes constituting the wound electrode bodies according to the examples, the NMP content in the positive electrode active material layer was calculated as the NMP content (ppm) with respect to the total solid content of the positive electrode active material layer. The obtained results are shown in the item "Positive Electrode Active Material Layer" of "NMP Content (ppm)" of Table 2 of FIG. 7.

The NMP content in the separator was analyzed using the following method. Specifically, first, each of the wound electrode bodies after drying was disassembled, and the extracted separator was cut into three pieces having an appropriate size (here, a square shape having a size of 5 mm×5 mm). The cut separator underwent an ultrasonic treatment for 30 minutes in a state of being dipped in 2 mL of acetone. As a result, NMP was extracted from the separator into acetone. Next, the acetone solution into which NMP was extracted was filtered using a syringe filter. As a result, a sample for measuring the NMP content was prepared. Next, the NMP content (g) in the sample for measuring the NMP content was quantitatively analyzed by GC-MS under the same conditions as in the case of measuring the NMP content in the positive electrode active material layer of each of the positive electrodes A to G (that is, the positive electrodes before forming the laminate (wound electrode body)). Based on the obtained results, the NMP content (g) in the separator provided for the measurement was calculated. Next, the NMP content was divided by the area ($cm^2$) of the separator provided for the measurement (typically, the area ($cm^2$) of the separator provided for the measurement in a plan view). As a result, the NMP content ($g/cm^2$) per unit area of the separator was obtained. The NMP content ($g/cm^2$) per unit area of the separator was divided by the mass per unit area ($g/cm^2$) of the positive electrode active material layer. As a result, the NMP content in the separator was calculated as the NMP content (ppm) with respect to the total solid content of the positive electrode active material layer. "Mass per unit area of the positive electrode active material layer" refers to the total mass per unit area of the positive electrode active material layers provided on the surfaces of the positive electrode current collector. The obtained results are shown in the item "Separator" of "NMP Content (ppm)" of Table 2 of FIG. 7.

A nonaqueous electrolytic solution was injected into each of the battery cases after drying through an opening of the battery case (injection hole for the nonaqueous electrolytic solution), and the opening was air-tightly sealed. As a result, batteries according to Examples 1 to 28 were constructed. As the nonaqueous electrolytic solution, a solution was used in which $LiPF_6$ as a supporting electrolyte was dissolved in a mixed solvent at a concentration of 1.1 mol/L, the mixed solvent containing ethylene carbonate (EC), ethyl methyl carbonate (EMC), and dimethyl carbonate (DMC) at a volume ratio (EC:EMC:DMC) of 30:40:30.

Each of the batteries according to the examples constructed as described above was charged (initially charged). Specifically, in a temperature condition of 25° C., the battery was charged at a constant charging rate (CC charging) of 1 C (current value) until the voltage between the positive and negative electrode terminals reached 4.1 V. Next, the operation was stopped for 5 minutes. Then, the battery was charged at a constant voltage (CV charging) until the current value reached 0.02 C (for about 1.5 hours). "1 C" refers to an amount of current at which the battery capacity (Ah) estimated from theoretical capacity can be charged in one hour. For example, when the battery capacity was 3.8 Ah, 1 C refers to 3.8 A.

<Measurement of Rated Capacity (Initial Capacity)>

Regarding each of the initially charged batteries according to the examples, the rated capacity was measured at a temperature of 25° C. through the following steps 1 to 3 in a voltage range of 3.0 V to 4.1 V.

(Step 1)

The battery was discharged at a constant current of 1 C until the voltage reached 3.0 V. Next, the battery was discharged at a constant voltage for 2 hours, and then the operation was stopped for 10 seconds.

(Step 2)

The battery was charged at a constant current of 1 C until the voltage reached 4.1 V. Next, the battery was discharged at a constant voltage for 2.5 hours, and then the operation was stopped for 10 seconds.

(Step 3)

The battery was discharged at a constant current of 0.5 C until the voltage reached 3.0 V. Next, the battery was discharged at a constant voltage for 2 hours, and then the operation was stopped for 10 seconds.

The discharge capacity (CCCV discharge capacity) ranging from the constant current discharge to the constant voltage discharge in Step 3 was set as the rated capacity (initial capacity). All the rated capacities (initial capacities) of the batteries of Examples 1 to 28 were about 3.8 Ah.

<Initial Output Measurement>

Regarding each of the batteries according to the examples after measuring the rated capacities, the initial output was measured as follows. Specifically, at a temperature of −30° C., the SOC of each of the batteries according the examples was adjusted to 27% through constant current-constant voltage (CC-CV) charging. Next, the battery was discharged at a constant power of 80 W, 90 W, 100 W, 110 W, 120 W, 130 W, or 140 W. At each discharge power, the time (number of seconds for discharge) was measured until the battery voltage was decreased to 2.0 V (discharge cut voltage) from the start of discharge. The number of seconds for discharge was plotted with respect to the power value (W), and a power value at the number of seconds for discharge of 2 seconds (that is, an output at which the battery in SOC 27% was discharged to 2.0 V in two seconds at −30° C.) was obtained as an initial output value. The initial output value of each of the batteries according to the examples is shown in the item "Initial Output Value (W)" of Table 2 of FIG. 7. Unless specified otherwise, "state of charge (SOC)" refers to the state of charge of a battery when a voltage range of the battery during normal use is set as a reference. For example, SOC refers to the state of charge when a rated capacity is set as a reference, the rated capacity being measured under the condition that the voltage between the terminals (open-circuit voltage (OCV)) is 3.0 V (lower limit voltage) to 4.1 V (upper limit voltage).

<Durability Test (Charging-Discharging Cycle Test)>

After the initial output was measured, a durability test (charging-discharging cycle test) of repeating 3500 cycles of charging and discharging in a high-temperature environment (60° C.) was performed on each of the batteries according to Examples 1 to 28. The output value (W) after the durability test was measured to evaluate durability. In the durability test (charging-discharging cycle test), in a temperature condition of 60° C., each of the batteries was charged at a constant current and at a charging rate of 2 C (here, 7.6 A) for one hour until the potential between the positive and negative electrode terminals reached 4.1 V. Next, the battery was discharged at a constant voltage and at a discharging rate of 2 C (here, 7.6 A) for one hour until the potential between the positive and negative electrode terminals reached 3.0 V. The charging and discharging operations were set as one cycle. 3500 cycles of the charging and discharging operations were repeated. After completion of the durability test (charging-discharging cycle test), the output value of each of the batteries was measured using the same method as in the initial output measurement. The results of measuring the output value of each of the batteries after the durability test are shown in "Output Value (W) after Durability Test" of Table 2 of FIG. 7. A ratio (Output Value after Durability Test/Initial Output Value×100) of the output value after the durability test (charging-discharging cycle test) to the initial output value was calculated. The ratio is shown in the item "Output Retention Ratio (%)" of Table 2 of FIG. 7.

Figure 5:
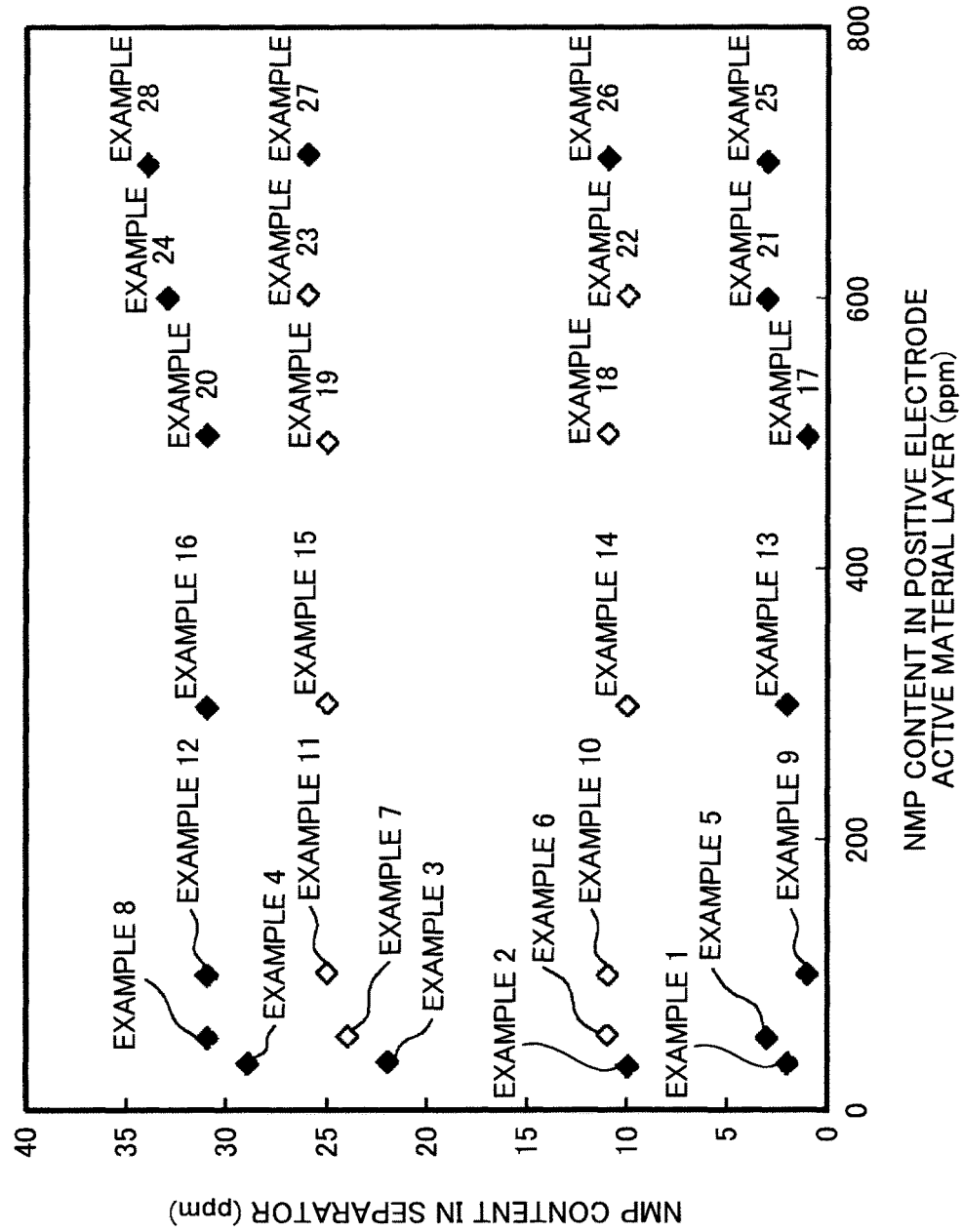
FIG. 5 is a graph showing a relationship between the NMP content in a positive electrode active material layer and a separator and output characteristics, in which the horizontal axis represents the NMP content in the positive electrode active material layer, the vertical axis represents the NMP contents in the separator, all the NMP contents are values (ppm) calculated with respect to the total solid content of the positive electrode active material layer, and when a predetermined charging-discharging cycle test was performed on each of batteries including electrode bodies which are different from each other in the NMP contents in the positive electrode active material layer and the separator, batteries in which the output after the charging-discharging cycle test was 98.4% or higher of the output before the charging-discharging cycle test are indicated by white marks in the drawing (in the graph)

As shown in Table 2 of FIG. 7 and FIG. 5, in the nonaqueous electrolyte secondary batteries according to Examples 6, 7, 10, 11, 14, 15, 18, 19, 22, and 23, the output characteristics after the durability test (after the charging-discharging cycle test) were superior as compared to in the batteries according to the other examples. Here, the configurations of the batteries according to Examples 1 to 23 were the same except for the NMP contents in the positive electrode active material layer and the separator. It was verified from the above results that superior output characteristics can be maintained over a long period of time in a nonaqueous electrolyte secondary battery including an electrode body in which the NMP content in the positive electrode active material layer is 54 ppm to 602 ppm with respect to the total solid content of the positive electrode active material layer; and the NMP content in the separator is 10 ppm to 26 ppm with respect to the total solid content of the positive electrode active material layer. That is, the electrode body, in which the NMP content in the positive electrode active material layer is 54 ppm to 602 ppm with respect to the total solid content of the positive electrode active material layer; and the NMP content in the separator is 10 ppm to 26 ppm with respect to the total solid content of the positive electrode active material layer, can be preferably used as an electrode body for a nonaqueous electrolyte secondary battery (lithium ion secondary battery).

As shown in Table 2 of FIG. 7, it was verified that a positive electrode (that is, the positive electrodes B to F) in which the NMP content in the positive electrode active material layer is 89 ppm to 1004 ppm with respect to the total solid content of the positive electrode active material layer can be preferably used as a positive electrode before an electrode body is configured. In addition, the following was verified: it is preferable that a laminate constructed using the positive electrode is left to stand (NMP is moved from the positive electrode active material layer into the separator) in a normal-temperature and normal-humidity environment for 1 hour to 2 hours.

Hereinabove, specific examples of the invention have been described in detail. However, these examples are merely exemplary and do not limit the claims. The technique described in the claims includes various modifications and alternations of the above-described specific examples.

What is claimed is:

1. An electrode body used for a nonaqueous electrolyte secondary battery, the electrode body comprising:
   a positive electrode that includes a positive electrode active material layer containing a positive electrode active material;
   a negative electrode that includes a negative electrode active material layer containing a negative electrode active material; and
   a separator that electrically separates the positive electrode and the negative electrode from each other, wherein
   the positive electrode active material layer and the separator contain N-methylpyrrolidone,
   a N-methylpyrrolidone content in the positive electrode active material layer is 54 ppm to 602 ppm with respect to a total solid content of the positive electrode active material layer, and
   a N-methylpyrrolidone content in the separator is 10 ppm to 26 ppm with respect to the total solid content of the positive electrode active material layer.

2. The electrode body according to claim 1, wherein the positive electrode active material is a lithium composite oxide.

3. The electrode body according to claim 1, wherein the electrode body is a wound electrode body in which the elongated positive electrode, the elongated negative electrode, and the elongated separator are laminated and wound in a longitudinal direction.

4. A nonaqueous electrolyte secondary battery comprising:
an electrode body in which a positive electrode including a positive electrode active material layer, a negative electrode including a negative electrode active material layer, and a separator electrically separating the positive electrode and the negative electrode from each other are laminated; and
a nonaqueous electrolytic solution, wherein
the electrode body is the electrode body according to claim 1.

5. A method of manufacturing an electrode body,
the electrode body including a positive electrode, a negative electrode, and a separator,
the positive electrode including a positive electrode active material layer containing a positive electrode active material,
the negative electrode including a negative electrode active material layer containing a negative electrode active material,
the separator electrically separating the positive electrode and the negative electrode from each other, and
the method comprising:
preparing a positive electrode in which the positive electrode active material layer is formed on a positive electrode current collector by applying a positive electrode active material layer-forming composition, which contains the positive electrode active material and N-methylpyrrolidone, to the positive electrode current collector, the positive electrode active material layer containing N-methylpyrrolidone;
laminating the positive electrode, and the negative electrode with the separator interposed therebetween to obtain a laminate; and
standing of the laminate, to stand for a predetermined amount of time such that a part of N-methylpyrrolidone in the positive electrode active material layer is moved into the separator; and
drying the laminate after the standing, wherein
the standing and the drying are performed such that a N-methylpyrrolidone content in the positive electrode active material layer of the dry laminate is 54 ppm to 602 ppm with respect to a total solid content of the positive electrode active material layer, and a N-methylpyrrolidone content in the separator of the dry laminate is 10 ppm to 26 ppm with respect to the total solid content of the positive electrode active material layer.

6. The method of manufacturing the electrode body according to claim 5, wherein
during the standing of the laminate, the laminate is left to stand in a normal-temperature and normal-humidity environment for 1 hour to 2 hours.

7. The method of manufacturing the electrode body according to claim 5, wherein
the positive electrode active material is a lithium composite oxide.

8. The method of manufacturing the electrode body according to claim 5, wherein
the electrode body is a wound electrode body in which the elongated positive electrode, the elongated negative electrode, and the elongated separator are laminated and wound in a longitudinal direction.

9. The method of manufacturing the electrode body according to any one of claim 6, wherein
the normal-temperature is a temperature in a range of 5° C. to 35° C., and
the normal-humidity is a relative humidity in a range of 45% rh to 85% rh.

10. The method of manufacturing the electrode body according to claim 5, wherein
a N-methylpyrrolidone content in a positive electrode active material layer of a positive electrode before an electrode body is configured is 89 ppm to 1004 ppm with respect to the total solid content of the positive electrode active material layer.

* * * * *

UNITED STATES PATENT AND TRADEMARK OFFICE
CERTIFICATE OF CORRECTION

PATENT NO. : 10,347,946 B2  
APPLICATION NO. : 15/522497  
DATED : July 9, 2019  
INVENTOR(S) : Takumi Tamaki and Satoru Takehara Page 1 of 1

It is certified that error appears in the above-identified patent and that said Letters Patent is hereby corrected as shown below:

On the Title Page

Inventors (72):  
Delete "Takuml Tamaki; Nisshin (JP); Satoru Takehara; Toyohashi (JP)"  
Insert --Takumi Tamaki; Nisshin (JP); Satoru Takehara; Toyohashi (JP)--

Signed and Sealed this  
Eleventh Day of February, 2020

Andrei Iancu  
*Director of the United States Patent and Trademark Office*